(12) United States Patent
Cook

(10) Patent No.: US 10,142,023 B2
(45) Date of Patent: Nov. 27, 2018

(54) ANTENNA SYSTEM AND METHODS FOR WIRELESS OPTICAL NETWORK TERMINATION

(71) Applicant: CenturyLink Intellectual Property LLC, Denver, CO (US)

(72) Inventor: Charles I. Cook, Louisville, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 299 days.

(21) Appl. No.: 14/261,226

(22) Filed: Apr. 24, 2014

(65) Prior Publication Data
US 2014/0233951 A1  Aug. 21, 2014

Related U.S. Application Data

(63) Continuation-in-part of application No. 13/965,830, filed on Aug. 13, 2013, now abandoned.

(51) Int. Cl.
*H04B 10/2575* (2013.01)
*H04L 29/06* (2006.01)
(Continued)

(52) U.S. Cl.
CPC ....... *H04B 10/25752* (2013.01); *H04L 63/02* (2013.01); *H04N 5/44513* (2013.01); *H04N 5/45* (2013.01); *H04N 21/222* (2013.01); *H04N 21/235* (2013.01); *H04N 21/234363* (2013.01); *H04N 21/4122* (2013.01);
(Continued)

(58) Field of Classification Search
CPC ..... H04L 41/12; H04L 67/16; H04L 12/2803; H04L 12/2818; H04L 41/0806; H04L 41/22; H04L 45/42; H04L 12/2856; H04L 12/2898
See application file for complete search history.

(56) References Cited

U.S. PATENT DOCUMENTS 4,775,997 A  10/1988  West, Jr. et al.
4,959,719 A   9/1990  Strubbe et al.
(Continued)

FOREIGN PATENT DOCUMENTS

EP  1225775 A1  7/2002

OTHER PUBLICATIONS

US 9,125,233, 09/2015, Morrill et al. (withdrawn)
(Continued)

*Primary Examiner* — Asad M Nawaz
*Assistant Examiner* — Najeeb Ansari
(74) *Attorney, Agent, or Firm* — Adsero IP

(57) ABSTRACT

Optical network termination systems, devices and methods including an optical network terminal (ONT) having a processor in communication with an external optical fiber. The ONT processors further in communication with a wireless access point and at least one electrically conductive internal transport medium, both providing for the communication of telecommunication signals with devices located within a customer premises. The wireless access point and in certain instances the processor are back powered over the electrically conductive internal transport medium from AC power within the premises. In certain embodiments, the wireless access point communicates with devices within the premises over a distributed antenna.

13 Claims, 17 Drawing Sheets

(51) Int. Cl.
*H04N 5/445* (2011.01)
*H04N 5/45* (2011.01)
*H04N 21/2343* (2011.01)
*H04N 21/235* (2011.01)
*H04N 21/41* (2011.01)
*H04N 21/4223* (2011.01)
*H04N 21/431* (2011.01)
*H04N 21/435* (2011.01)
*H04N 21/4363* (2011.01)
*H04N 21/462* (2011.01)
*H04N 21/4782* (2011.01)
*H04N 21/488* (2011.01)
*H04N 21/6377* (2011.01)
*H04N 21/658* (2011.01)
*H04N 21/6587* (2011.01)
*H04N 21/222* (2011.01)
*H04N 7/10* (2006.01)
*H04N 7/173* (2011.01)
*H04N 7/22* (2006.01)
*H04W 88/08* (2009.01)
*H04L 12/28* (2006.01)

(52) U.S. Cl.
CPC ....... *H04N 21/4223* (2013.01); *H04N 21/435* (2013.01); *H04N 21/4316* (2013.01); *H04N 21/43632* (2013.01); *H04N 21/4622* (2013.01); *H04N 21/4782* (2013.01); *H04N 21/4886* (2013.01); *H04N 21/6377* (2013.01); *H04N 21/658* (2013.01); *H04N 21/6587* (2013.01); *H04L 12/2834* (2013.01); *H04N 7/108* (2013.01); *H04N 7/22* (2013.01); *H04N 2007/1739* (2013.01); *H04W 88/08* (2013.01)

(56) References Cited

U.S. PATENT DOCUMENTS

| | | |
|---|---|---|
| 4,989,230 A | 1/1991 | Gillig et al. |
| 5,111,296 A | 5/1992 | Duffield et al. |
| 5,202,765 A | 4/1993 | Lineberry |
| 5,327,156 A | 7/1994 | Masukane |
| 5,361,098 A | 11/1994 | Lucas |
| 5,398,074 A | 3/1995 | Duffield et al. |
| 5,418,559 A | 5/1995 | Blahut |
| 5,463,422 A | 10/1995 | Simpson et al. |
| 5,485,221 A | 1/1996 | Banker et al. |
| 5,488,412 A | 1/1996 | Majeti et al. |
| 5,511,114 A | 4/1996 | Stimson et al. |
| 5,515,435 A | 5/1996 | DeBalko et al. |
| 5,526,403 A | 6/1996 | Tam |
| 5,541,670 A | 7/1996 | Hanai |
| 5,541,671 A | 7/1996 | Pugel |
| 5,559,549 A | 9/1996 | Hendricks et al. |
| 5,585,837 A | 12/1996 | Nixon |
| 5,600,716 A | 2/1997 | Broome et al. |
| 5,602,598 A | 2/1997 | Shintani |
| 5,621,429 A | 4/1997 | Yamaashi et al. |
| 5,621,482 A | 4/1997 | Gardner et al. |
| 5,621,787 A | 4/1997 | McKoy et al. |
| 5,623,542 A | 4/1997 | Schneider et al. |
| 5,625,686 A | 4/1997 | Capper et al. |
| 5,633,683 A | 5/1997 | Rosengren et al. |
| 5,635,980 A | 6/1997 | Lin et al. |
| 5,638,112 A | 6/1997 | Bestler et al. |
| 5,657,076 A | 8/1997 | Tapp |
| 5,668,862 A | 9/1997 | Bannister et al. |
| 5,671,019 A | 9/1997 | Isoe et al. |
| 5,673,692 A | 10/1997 | Schulze et al. |
| 5,675,390 A | 10/1997 | Schindler et al. |
| 5,691,777 A | 11/1997 | Kassatly |
| 5,694,616 A | 12/1997 | Johnson et al. |
| 5,703,944 A | 12/1997 | DeBalko |
| 5,740,075 A | 4/1998 | Bigham et al. |
| 5,748,255 A | 5/1998 | Johnson et al. |
| 5,760,842 A | 6/1998 | Song |
| 5,771,465 A | 6/1998 | Bojeryd |
| 5,774,172 A | 6/1998 | Kapell et al. |
| 5,774,664 A | 6/1998 | Hidary et al. |
| 5,774,666 A | 6/1998 | Portuesi |
| 5,774,885 A | 6/1998 | Delfer, III |
| 5,781,620 A | 7/1998 | Montgomery et al. |
| 5,784,683 A | 7/1998 | Sistanizadeh |
| 5,790,201 A | 8/1998 | Antos |
| 5,815,208 A | 9/1998 | Samuela et al. |
| 5,815,216 A | 9/1998 | Suh |
| 5,831,591 A | 11/1998 | Suh |
| 5,844,552 A | 12/1998 | Gaughan et al. |
| 5,861,881 A | 1/1999 | Freeman et al. |
| 5,889,954 A | 3/1999 | Gessel et al. |
| 5,894,320 A | 4/1999 | Vancelette |
| 5,900,867 A | 5/1999 | Schindler et al. |
| 5,900,916 A | 5/1999 | Pauley |
| 5,901,220 A | 5/1999 | Garver et al. |
| 5,912,668 A | 6/1999 | Sciammarella et al. |
| 5,912,711 A | 6/1999 | Lin et al. |
| 5,914,846 A | 6/1999 | Smith et al. |
| 5,923,379 A | 7/1999 | Patterson |
| 5,969,769 A | 10/1999 | Hamadate |
| 5,970,386 A | 10/1999 | Williams |
| 5,971,921 A | 10/1999 | Timbel |
| 5,977,963 A | 11/1999 | Gaughan et al. |
| 5,983,068 A | 11/1999 | Tomich et al. |
| 6,012,100 A | 1/2000 | Frailong et al. |
| 6,039,578 A | 3/2000 | Suffi et al. |
| 6,058,430 A | 5/2000 | Kaplan |
| 6,061,719 A | 5/2000 | Bendinelli et al. |
| 6,069,899 A | 5/2000 | Foley |
| 6,070,127 A | 5/2000 | Hirono et al. |
| 6,073,171 A | 6/2000 | Gaughan et al. |
| 6,078,661 A | 6/2000 | Arnett et al. |
| 6,084,638 A | 7/2000 | Hare et al. |
| 6,097,383 A | 8/2000 | Gaughan et al. |
| 6,134,320 A | 10/2000 | Swan et al. |
| 6,188,397 B1 | 2/2001 | Humpleman |
| 6,201,538 B1 | 3/2001 | Wugofski |
| 6,202,212 B1 | 3/2001 | Sturgeon et al. |
| 6,208,384 B1 | 3/2001 | Schultheiss |
| 6,208,637 B1 | 3/2001 | Eames |
| 6,209,025 B1 | 3/2001 | Bellamy |
| 6,212,585 B1 | 4/2001 | Chrabaszcz |
| 6,226,379 B1 | 5/2001 | Swan et al. |
| 6,229,890 B1 | 5/2001 | Kerr et al. |
| 6,240,553 B1 | 5/2001 | Son et al. |
| 6,256,785 B1 | 7/2001 | Klappert et al. |
| 6,259,440 B1 | 7/2001 | Vaughan et al. |
| 6,272,680 B1 | 8/2001 | Gaughan et al. |
| 6,282,189 B1 | 8/2001 | Eames |
| 6,288,749 B1 | 9/2001 | Freadman |
| 6,299,526 B1 | 10/2001 | Cowan et al. |
| 6,300,980 B1 | 10/2001 | Hidary et al. |
| 6,307,933 B1 | 10/2001 | Stehlin et al. |
| 6,313,851 B1 | 11/2001 | Matthews et al. |
| 6,317,164 B1 | 11/2001 | Hrusecky et al. |
| 6,322,375 B1 | 11/2001 | Cole et al. |
| 6,324,184 B1 | 11/2001 | Hou et al. |
| 6,324,694 B1 | 11/2001 | Watts et al. |
| 6,326,982 B1 | 12/2001 | Wu et al. |
| 6,327,363 B1 | 12/2001 | Henderson et al. |
| 6,330,285 B1 | 12/2001 | Crosby et al. |
| 6,331,852 B1 | 12/2001 | Gould et al. |
| 6,333,976 B2 | 12/2001 | Lesley |
| 6,337,717 B1 | 1/2002 | Nason et al. |
| 6,349,410 B1 | 2/2002 | Lortz |
| 6,357,045 B1 | 3/2002 | Devaney |
| 6,359,973 B1 | 3/2002 | Rahamim et al. |
| 6,377,861 B1 | 4/2002 | York |
| 6,381,745 B1 | 4/2002 | Paul |
| 6,392,664 B1 | 5/2002 | White et al. |
| 6,396,480 B1 | 5/2002 | Schindler et al. |
| 6,397,256 B1 | 5/2002 | Chan et al. |
| 6,405,371 B1 | 6/2002 | Oosterhout et al. |

(56) References Cited

U.S. PATENT DOCUMENTS

| | | |
|---|---|---|
| 6,426,950 B1 | 7/2002 | Mistry |
| 6,438,596 B1 | 8/2002 | Ueno et al. |
| 6,441,861 B2 | 8/2002 | Vaughan et al. |
| 6,443,890 B1 | 9/2002 | Schulze et al. |
| 6,452,611 B1 | 9/2002 | Gerba et al. |
| 6,452,923 B1 | 9/2002 | Gerszberg et al. |
| 6,456,335 B1 | 9/2002 | Miura et al. |
| 6,456,340 B1 | 9/2002 | Margulis |
| 6,463,273 B1 | 10/2002 | Day |
| 6,481,012 B1 | 11/2002 | Gordon et al. |
| 6,481,013 B1 | 11/2002 | Dinwiddie et al. |
| 6,486,892 B1 | 11/2002 | Stern |
| 6,492,997 B1 | 12/2002 | Gerba et al. |
| 6,493,036 B1 | 12/2002 | Fernandez |
| 6,493,038 B1 | 12/2002 | Singh et al. |
| 6,493,878 B1 | 12/2002 | Kassatly |
| 6,502,242 B1 | 12/2002 | Howe et al. |
| 6,505,123 B1 | 1/2003 | Root et al. |
| 6,510,152 B1 | 1/2003 | Gerszberg et al. |
| 6,510,533 B1 | 1/2003 | Siek et al. |
| 6,510,557 B1 | 1/2003 | Thrift |
| 6,512,551 B1 | 1/2003 | Lund |
| 6,512,552 B1 | 1/2003 | Subramanian |
| 6,519,263 B1 | 2/2003 | Cheney et al. |
| 6,526,579 B2 | 2/2003 | Sato |
| 6,526,581 B1 | 2/2003 | Edson |
| 6,536,041 B1 | 3/2003 | Knudson et al. |
| 6,538,701 B1 | 3/2003 | Yuen |
| 6,542,500 B1 | 4/2003 | Gerszberg et al. |
| 6,544,174 B2 | 4/2003 | West et al. |
| 6,556,251 B1 | 4/2003 | Sorensen |
| 6,556,252 B1 | 4/2003 | Kim |
| 6,556,253 B1 | 4/2003 | Megied et al. |
| 6,563,515 B1 | 5/2003 | Reynolds et al. |
| 6,567,106 B1 | 5/2003 | Wugofski |
| 6,567,984 B1 | 5/2003 | Allport |
| 6,574,236 B1 | 6/2003 | Gosselin et al. |
| 6,590,615 B2 | 7/2003 | Murakami et al. |
| 6,593,937 B2 | 7/2003 | Ludtke et al. |
| 6,621,870 B1 | 9/2003 | Gordon et al. |
| 6,628,302 B2 | 9/2003 | White et al. |
| 6,640,239 B1 * | 10/2003 | Gidwani ............ H04L 29/06027 370/353 |
| 6,658,464 B2 | 12/2003 | Reisman |
| 6,678,007 B2 | 1/2004 | Nason et al. |
| 6,678,009 B2 | 1/2004 | Kahn |
| 6,687,374 B2 | 2/2004 | Leuca et al. |
| 6,700,625 B1 | 3/2004 | Fujii |
| 6,714,264 B1 | 3/2004 | Kempisty |
| 6,727,886 B1 | 4/2004 | Mielekamp et al. |
| 6,727,918 B1 | 4/2004 | Nason |
| 6,727,960 B2 | 4/2004 | Seo |
| 6,731,942 B1 | 5/2004 | Nageli |
| 6,732,373 B2 | 5/2004 | Harrison et al. |
| 6,738,820 B1 | 5/2004 | Hilt |
| 6,741,617 B2 | 5/2004 | Rosengren et al. |
| 6,745,021 B1 | 6/2004 | Stevens |
| 6,757,707 B1 | 6/2004 | Houghton et al. |
| 6,760,782 B1 | 7/2004 | Swales |
| 6,784,945 B2 | 8/2004 | Norsworthy et al. |
| 6,785,906 B1 | 8/2004 | Gaughan et al. |
| 6,795,506 B1 | 9/2004 | Zhang et al. |
| 6,795,552 B1 | 9/2004 | Stanush et al. |
| 6,807,564 B1 | 10/2004 | Zeliner et al. |
| 6,809,776 B1 | 10/2004 | Simpson |
| 6,816,878 B1 | 11/2004 | Zimmers et al. |
| 6,833,874 B2 | 12/2004 | Ozaki et al. |
| 6,833,877 B2 | 12/2004 | Wang |
| 6,842,628 B1 | 1/2005 | Arnold et al. |
| 6,857,131 B1 | 2/2005 | Yagawa et al. |
| 6,882,714 B2 | 4/2005 | Mansfield |
| 6,889,385 B1 | 5/2005 | Rakib et al. |
| 6,896,276 B1 | 5/2005 | Sparrow |
| 6,898,413 B2 | 5/2005 | Yip et al. |
| 6,903,753 B1 | 6/2005 | Gray et al. |
| 6,909,903 B2 | 6/2005 | Wang |
| 6,924,846 B2 | 8/2005 | Ohba et al. |
| 6,934,753 B2 | 8/2005 | Kim |
| 6,948,076 B2 | 9/2005 | Saito |
| 6,957,275 B1 | 10/2005 | Sekiguchi |
| 6,970,127 B2 | 11/2005 | Rakib |
| 6,970,181 B1 | 11/2005 | Fadel |
| 6,975,324 B1 | 12/2005 | Valmiki et al. |
| 6,978,474 B1 | 12/2005 | Sheppard et al. |
| 6,987,734 B2 | 1/2006 | Hundemer |
| 6,990,192 B1 | 1/2006 | Denovich et al. |
| 6,990,591 B1 | 1/2006 | Pearson |
| 7,010,608 B2 | 3/2006 | Garg et al. |
| 7,020,652 B2 | 3/2006 | Matz et al. |
| 7,023,492 B2 | 4/2006 | Sullivan |
| 7,024,677 B1 | 4/2006 | Snyder et al. |
| 7,028,327 B1 | 4/2006 | Dougherty et al. |
| 7,028,330 B1 | 4/2006 | Gaughan et al. |
| 7,035,270 B2 | 4/2006 | Moore et al. |
| 7,055,169 B2 | 5/2006 | Delpuch et al. |
| 7,096,487 B1 | 8/2006 | Gordon et al. |
| 7,099,443 B2 | 8/2006 | Phillips et al. |
| 7,102,691 B2 | 9/2006 | Dischert et al. |
| 7,114,169 B1 | 9/2006 | Kahn |
| 7,123,700 B1 | 10/2006 | Weaver et al. |
| 7,180,988 B2 | 2/2007 | Phillips et al. |
| 7,187,418 B2 | 3/2007 | Phillips et al. |
| 7,194,249 B2 | 3/2007 | Phillips et al. |
| 7,206,029 B2 | 4/2007 | Cohen-Solal |
| 7,233,781 B2 | 6/2007 | Hunter et al. |
| 7,239,698 B2 | 7/2007 | Phillips et al. |
| 7,248,563 B2 | 7/2007 | Bhogal et al. |
| 7,250,846 B2 | 7/2007 | Ebling et al. |
| 7,263,362 B1 | 8/2007 | Young et al. |
| 7,264,590 B2 | 9/2007 | Casey et al. |
| 7,283,045 B1 | 10/2007 | Manz |
| 7,283,505 B1 | 10/2007 | Meenan et al. |
| 7,369,838 B1 * | 5/2008 | Murray .................... H04B 7/15 370/338 |
| 7,389,104 B2 | 6/2008 | Phillips et al. |
| 7,433,465 B2 | 10/2008 | Casey et al. |
| 7,480,369 B2 | 1/2009 | Magarasevic et al. |
| 7,617,317 B2 | 11/2009 | Jones et al. |
| 7,631,047 B1 | 12/2009 | Adamcyzk et al. |
| 7,673,321 B2 | 3/2010 | Yurt et al. |
| 7,792,996 B2 | 9/2010 | Monette et al. |
| 7,793,003 B2 | 9/2010 | Casey et al. |
| 8,050,281 B2 | 10/2011 | Casey et al. |
| 8,082,353 B2 | 12/2011 | Huber et al. |
| 8,086,271 B2 | 12/2011 | Dent |
| 8,127,011 B2 | 2/2012 | Monette |
| 8,447,332 B2 | 5/2013 | Weinreich et al. |
| 8,490,129 B2 | 7/2013 | Phillips et al. |
| 8,537,814 B2 | 9/2013 | Phillips et al. |
| 8,655,979 B2 | 2/2014 | Phillips et al. |
| 8,713,617 B2 | 4/2014 | Phillips et al. |
| 9,392,641 B2 | 7/2016 | Morrill et al. |
| 9,497,800 B2 | 11/2016 | Cook |
| 9,591,602 B2 | 3/2017 | Bamburak |
| 9,743,462 B2 | 8/2017 | Cook |
| 2001/0012319 A1 * | 8/2001 | Foley .................. H04M 7/0069 375/222 |
| 2001/0021997 A1 | 9/2001 | Lee |
| 2001/0024239 A1 | 9/2001 | Feder et al. |
| 2001/0028642 A1 | 10/2001 | Veschi |
| 2001/0048481 A1 | 12/2001 | Hatano et al. |
| 2002/0013847 A1 | 1/2002 | Fisher et al. |
| 2002/0021465 A1 | 2/2002 | Moore et al. |
| 2002/0022991 A1 | 2/2002 | Sharood et al. |
| 2002/0026642 A1 | 2/2002 | Augenbraun et al. |
| 2002/0037004 A1 | 3/2002 | Bossemeyer et al. |
| 2002/0044225 A1 | 4/2002 | Rakib |
| 2002/0054062 A1 | 5/2002 | Gerba et al. |
| 2002/0057372 A1 | 5/2002 | Cavallerano et al. |
| 2002/0063924 A1 * | 5/2002 | Kimbrough .......... H04B 10/272 398/79 |
| 2002/0087724 A1 | 7/2002 | Datta et al. |
| 2002/0089605 A1 | 7/2002 | Min |
| 2002/0100054 A1 | 7/2002 | Feinberg et al. |

(56) References Cited

U.S. PATENT DOCUMENTS

| | | |
|---|---|---|
| 2002/0101858 A1 | 8/2002 | Stuart et al. |
| 2002/0110115 A1 | 8/2002 | Gorman et al. |
| 2002/0116720 A1 | 8/2002 | Terry et al. |
| 2002/0122136 A1 | 9/2002 | Safadi et al. |
| 2002/0124247 A1 | 9/2002 | Houghton |
| 2002/0147987 A1 | 10/2002 | Reynolds et al. |
| 2002/0171552 A1 | 11/2002 | Tate |
| 2002/0175998 A1 | 11/2002 | Hoang |
| 2002/0180579 A1 | 12/2002 | Nagaoka et al. |
| 2003/0013441 A1 | 1/2003 | Bhogal et al. |
| 2003/0016304 A1 | 1/2003 | Norsworthy et al. |
| 2003/0026416 A1 | 2/2003 | Fusco |
| 2003/0027521 A1 | 2/2003 | Yip et al. |
| 2003/0028879 A1 | 2/2003 | Gordon et al. |
| 2003/0030652 A1 | 2/2003 | Billmaier et al. |
| 2003/0035075 A1 | 2/2003 | Butler et al. |
| 2003/0056215 A1 | 3/2003 | Kanungo |
| 2003/0066082 A1 | 4/2003 | Kllger et al. |
| 2003/0067926 A1 | 4/2003 | Golikeri et al. |
| 2003/0069002 A1 | 4/2003 | Hunter et al. |
| 2003/0072330 A1 | 4/2003 | Yang et al. |
| 2003/0074372 A1 | 4/2003 | Barchi et al. |
| 2003/0078962 A1 | 4/2003 | Fabbricatore |
| 2003/0083533 A1 | 5/2003 | Gerba et al. |
| 2003/0106067 A1* | 6/2003 | Hoskins .............. H04L 12/2801 |
| | | 725/119 |
| 2003/0131142 A1 | 7/2003 | Horvitz et al. |
| 2003/0179858 A1 | 9/2003 | Bella et al. |
| 2003/0184679 A1 | 10/2003 | Meehan |
| 2003/0192057 A1 | 10/2003 | Gaughan et al. |
| 2003/0201889 A1 | 10/2003 | Zulkowski |
| 2003/0225641 A1 | 12/2003 | Gritzmacher et al. |
| 2003/0226143 A1 | 12/2003 | Michael et al. |
| 2004/0004538 A1 | 1/2004 | Manis et al. |
| 2004/0006772 A1 | 1/2004 | Ansari et al. |
| 2004/0008761 A1 | 1/2004 | Keliher et al. |
| 2004/0027487 A1 | 2/2004 | Rzadzki et al. |
| 2004/0044736 A1 | 3/2004 | Austin-Lane et al. |
| 2004/0049781 A1 | 3/2004 | Grzeczkowski et al. |
| 2004/0052578 A1 | 3/2004 | Baldino et al. |
| 2004/0053600 A1* | 3/2004 | Chow .................. H04W 8/265 |
| | | 455/411 |
| 2004/0073941 A1 | 4/2004 | Ludvig et al. |
| 2004/0078457 A1 | 4/2004 | Tindal |
| 2004/0092276 A1 | 5/2004 | Dooley |
| 2004/0100975 A1 | 5/2004 | Kreiner et al. |
| 2004/0136373 A1* | 7/2004 | Bareis ................ H04L 12/2801 |
| | | 370/392 |
| 2004/0150158 A1 | 8/2004 | Biegelsen et al. |
| 2004/0150518 A1 | 8/2004 | Phillips et al. |
| 2004/0150748 A1 | 8/2004 | Phillips et al. |
| 2004/0150749 A1 | 8/2004 | Phillips et al. |
| 2004/0150750 A1 | 8/2004 | Phillips et al. |
| 2004/0150751 A1 | 8/2004 | Phillips et al. |
| 2004/0151161 A1 | 8/2004 | Casey et al. |
| 2004/0151168 A1 | 8/2004 | Phillips et al. |
| 2004/0151289 A1 | 8/2004 | Phillips et al. |
| 2004/0151290 A1 | 8/2004 | Magarasevic et al. |
| 2004/0152493 A1 | 8/2004 | Phillips |
| 2004/0153289 A1 | 8/2004 | Casey et al. |
| 2004/0153577 A1 | 8/2004 | Phillips et al. |
| 2004/0153670 A1 | 8/2004 | Casey et al. |
| 2004/0160460 A1 | 8/2004 | Casey et al. |
| 2004/0163125 A1 | 8/2004 | Phillips et al. |
| 2004/0163126 A1 | 8/2004 | Casey et al. |
| 2004/0163128 A1 | 8/2004 | Phillips et al. |
| 2004/0168199 A1 | 8/2004 | Phillips et al. |
| 2004/0172657 A1 | 9/2004 | Phillips et al. |
| 2004/0176085 A1 | 9/2004 | Phillips et al. |
| 2004/0177163 A1 | 9/2004 | Casey et al. |
| 2004/0181692 A1 | 9/2004 | Wild et al. |
| 2004/0181813 A1 | 9/2004 | Ota et al. |
| 2004/0184523 A1 | 9/2004 | Dawson et al. |
| 2004/0213286 A1 | 10/2004 | Jette et al. |
| 2004/0223605 A1 | 11/2004 | Donnelly |
| 2004/0252675 A1 | 12/2004 | Lund |
| 2004/0258049 A1 | 12/2004 | Sylvain et al. |
| 2004/0264687 A1 | 12/2004 | Casey et al. |
| 2005/0018653 A1 | 1/2005 | Phillips et al. |
| 2005/0022007 A1 | 1/2005 | Phillips et al. |
| 2005/0027715 A1 | 2/2005 | Casey et al. |
| 2005/0030977 A1 | 2/2005 | Casey et al. |
| 2005/0034155 A1 | 2/2005 | Gordon et al. |
| 2005/0041787 A1 | 2/2005 | Casey et al. |
| 2005/0048957 A1 | 3/2005 | Casey et al. |
| 2005/0064831 A1 | 3/2005 | Feenstra et al. |
| 2005/0071882 A1 | 3/2005 | Rodriguez et al. |
| 2005/0091695 A1 | 4/2005 | Paz et al. |
| 2005/0149981 A1 | 7/2005 | Augenbraun et al. |
| 2005/0166232 A1 | 7/2005 | Lamkin et al. |
| 2005/0266720 A1 | 12/2005 | Lin |
| 2006/0020992 A1 | 1/2006 | Pugel et al. |
| 2006/0031582 A1 | 2/2006 | Pugel et al. |
| 2006/0156368 A1 | 7/2006 | Campbell |
| 2006/0259941 A1 | 11/2006 | Goldberg et al. |
| 2007/0097956 A1 | 5/2007 | Okmianski et al. |
| 2007/0247262 A1 | 10/2007 | Park |
| 2008/0081557 A1* | 4/2008 | Murray .................. H04B 7/15 |
| | | 455/14 |
| 2008/0160984 A1 | 7/2008 | Benes et al. |
| 2009/0017862 A1* | 1/2009 | Yaginuma ............ H04B 5/0018 |
| | | 455/523 |
| 2009/0131023 A1 | 5/2009 | Lorello |
| 2009/0182768 A1 | 7/2009 | Stevens et al. |
| 2009/0201830 A1 | 8/2009 | Angelot et al. |
| 2010/0027482 A1 | 2/2010 | Murakami et al. |
| 2010/0082775 A1 | 4/2010 | Banga et al. |
| 2010/0195562 A1* | 8/2010 | Ishizu .................. H04W 48/18 |
| | | 370/315 |
| 2010/0299407 A1 | 11/2010 | Casey et al. |
| 2011/0131338 A1 | 6/2011 | Hu |
| 2012/0134279 A1* | 5/2012 | Tamaki ................ H04B 7/024 |
| | | 370/248 |
| 2012/0254349 A1 | 10/2012 | Quigley et al. |
| 2013/0155849 A1 | 6/2013 | Koodli et al. |
| 2013/0272696 A1* | 10/2013 | Palanisamy ...... H04B 10/25754 |
| | | 398/25 |
| 2013/0273962 A1 | 10/2013 | Phillips et al. |
| 2013/0308470 A1* | 11/2013 | Bevan .................. H04W 64/00 |
| | | 370/252 |
| 2013/0329745 A1 | 12/2013 | Phillips et al. |
| 2013/0333016 A1 | 12/2013 | Coughlin et al. |
| 2014/0010149 A1 | 1/2014 | Cook |
| 2014/0010171 A1 | 1/2014 | Morrill et al. |
| 2014/0113671 A1* | 4/2014 | Schwengler .......... H04W 16/00 |
| | | 455/517 |
| 2014/0233951 A1 | 8/2014 | Cook |
| 2017/0041985 A1 | 2/2017 | Cook |

OTHER PUBLICATIONS

U.S. Appl. No. 13/541,839; Final Rejection dated Apr. 2, 2015; 13 pages.

U.S. Appl. No. 13/541,839; Non-Final Office Action dated Jul. 28, 2015; 14 pages.

U.S. Appl. No. 13/541,839; Non-Final Rejection dated Dec. 26, 2014; 14 pages.

U.S. Appl. No. 13/541,839; Notice of Panel Decision dated Nov. 17, 2014; 2 pages.

U.S. Appl. No. 13/827,163; Issue Notification dated Aug. 12, 2015; 1 page.

U.S. Appl. No. 13/827,163; Notice of Allowance dated Apr. 29, 2015; 21 pages.

U.S. Appl. No. 13/827,163; Office Action dated Feb. 26, 2015; 26 pages.

Frank, Edward and Holloway, Jack: "Connecting the Home with a Phone Line Network Chip Set", IEEE Micro, Mar.-Apr. 2000, pp. 2-14.

NextNet Wireless, NextNet Expedience, NLOS Plug-and-Play Portable Customer Premise Equipment Integrated Radio Modem, Non Line-of-Sight Broadband Wireless Residential Subscriber Unit (RSU-

(56) References Cited

OTHER PUBLICATIONS

2510A), http://www.nextnetwireless.com/assets/news/media/PDF/rsu_2510AMODrev1.pdf, 2 pages (Sep. 21, 2004).
NTT Transmission Systems Laboratories, "ATM Access Network Architecture"; Maeda et al.; IEEE International Conference on Jun. 23-26, 1991; pp. 687-691.
U.S. Appl. No. 13/243,706; Notice of Publication dated Jan. 19, 2012; 1 page.
U.S. Appl. No. 10/356,364; Final Office Action dated Apr. 7, 2006; 9 pages.
U.S. Appl. No. 10/356,364; Issue Notification dated Jan. 31, 2007; 1 page.
U.S. Appl. No. 10/356,364; Non-Final Office Action dated Sep. 25, 2005; 9 pages.
U.S. Appl. No. 10/356,364; Notice of Allowance dated Oct. 17, 2006; 7 pages.
U.S. Appl. No. 10/356,364; Supplemental Notice of Allowance dated Dec. 5, 2006; 2 pages.
U.S. Appl. No. 10/377,283, Advisory Action dated Jul. 2, 2007; 3 pages.
U.S. Appl. No. 10/377,283, Advisory Action dated Jun. 3, 2008; 3 pages.
U.S. Appl. No. 10/377,283, Final Rejection dated Mar. 26, 2007; 8 pages.
U.S. Appl. No. 10/377,283, Final Rejection dated Mar. 26, 2008; 10 pages.
U.S. Appl. No. 10/377,283, Final Rejection dated May 24, 2006; 9 pages.
U.S. Appl. No. 10/377,283, Office Action dated Dec. 15, 2005; 7 pages.
U.S. Appl. No. 10/377,283, Office Action dated Jul. 25, 2008; 10 pages.
U.S. Appl. No. 10/377,283, Office Action dated Oct. 11, 2006; 8 pages.
U.S. Appl. No. 10/377,283, Office Action dated Sep. 28, 2007; 8 pages.
U.S. Appl. No. 10/377,290, Advisory Action dated Jul. 2, 2007.
U.S. Appl. No. 10/377,290, Final Rejection dated Apr. 21, 2008.
U.S. Appl. No. 10/377,290, Final Rejection dated Mar. 26, 2007.
U.S. Appl. No. 10/377,290, Final Rejection dated May 24, 2006; 10 pages.
U.S. Appl. No. 10/377,290, Office Action dated Dec. 15, 2005; 12 pages.
U.S. Appl. No. 10/377,290, Office Action dated Oct. 11, 2006.
U.S. Appl. No. 10/377,290, Office Action dated Sep. 26, 2007.
U.S. Appl. No. 10/377,282, Advisory Action dated Jul. 2, 2007.
U.S. Appl. No. 10/377,282, Advisory Action Jun. 19, 2008.
U.S. Appl. No. 10/377,282, Final Rejection dated Apr. 8, 2008.
U.S. Appl. No. 10/377,282, Final Rejection dated Mar. 23, 2007.
U.S. Appl. No. 10/377,282, Final Rejection dated May 24, 2006; 15 pages.
U.S. Appl. No. 10/377,282, Office Action dated Dec. 21, 2005; 14 pages.
U.S. Appl. No. 10/377,282, Office Action dated Jul. 25, 2008.
U.S. Appl. No. 10/377,282, Office Action dated Oct. 11, 2006.
U.S. Appl. No. 10/377,282, Office Action dated Sep. 28, 2007.
U.S. Appl. No. 10/377,584, Advisory Action dated Apr. 20, 2006.
U.S. Appl. No. 10/367,596; Decision on Appeal dated Apr. 23, 2012;10 pages.
U.S. Appl. No. 10/367,596; Final Rejection dated Dec. 5, 2012; 11 pages.
U.S. Appl. No. 10/367,596; Non-Final Rejection dated Aug. 24, 2012; 12 pages.
U.S. Appl. No. 10/367,596, Advisory Action dated Apr. 13, 2006.
U.S. Appl. No. 10/367,596, Advisory Action dated Mar. 4, 2009.
U.S. Appl. No. 10/367,596, Appeal Brief dated Jul. 7, 2006; 17 pages.
U.S. Appl. No. 10/367,596, Examiner's Answer to Appeal Brief dated Aug. 6, 2009.
U.S. Appl. No. 10/367,596, Final Rejection dated Dec. 19, 2008.
U.S. Appl. No. 10/367,596, Final Rejection dated Feb. 10, 2006; 7 pages.
U.S. Appl. No. 10/367,596, Final Rejection dated May 25, 2007; 7 pages.
U.S. Appl. No. 10/367,596, Final Rejection dated Sep. 28, 2007; 6 pages.
U.S. Appl. No. 10/367,596, Final Rejection dated Sep. 8, 2006; 6 pages.
U.S. Appl. No. 10/367,596, Office Action dated Mar. 31, 2008; 6 pages.
U.S. Appl. No. 10/367,596, Office Action dated Dec. 18, 2006; 6 pages.
U.S. Appl. No. 10/367,596, Office Action dated Sep. 30, 2005; 9 pages.
U.S. Appl. No. 10/377,281, Advisory Action dated Jul. 2, 2007.
U.S. Appl. No. 10/377,281, Final Rejection dated Apr. 21, 2008.
U.S. Appl. No. 10/377,281, Final Rejection dated Mar. 26, 2007.
U.S. Appl. No. 10/377,281, Final Rejection dated May 24, 2006; 10 pages.
U.S. Appl. No. 10/377,281, Office Action dated Dec. 21, 2005; 13 pages.
U.S. Appl. No. 10/377,281, Office Action dated Oct. 11, 2006.
U.S. Appl. No. 10/377,281, Office Action dated Sep. 26, 2007.
U.S. Appl. No. 10/444,941, Decision on Appeal dated Aug. 2, 2013; 13 pages.
U.S. Appl. No. 10/444,941, Corrections to Examiner's Answer to Appeal Brief dated May 10, 2010.
U.S. Appl. No. 10/444,941, Examiner's Answer to Appeal Brief dated Mar. 15, 2010.
U.S. Appl. No. 10/444,941, Final Rejection dated Dec. 13, 2007; 17 pages.
U.S. Appl. No. 10/444,941, Final Rejection dated Jun. 23, 2009.
U.S. Appl. No. 10/444,941, Office Action dated Aug. 17, 2007; 18 pages.
U.S. Appl. No. 10/444,941, Office Action dated Jan. 21, 2009.
U.S. Appl. No. 10/448,249, Office Action dated Sep. 4, 2008, 19 pages.
U.S. Appl. No. 10/624,454, Advisory Action dated Jan. 7, 2010, 3 pgs.
U.S. Appl. No. 10/624,454, Advisory Action dated Jun. 19, 2008, 3 pages.
U.S. Appl. No. 10/624,454, Advisory Action dated Mar. 13, 2009, 3 pgs.
U.S. Appl. No. 10/624,454, Final Rejection dated Apr. 7, 2008, 10 pages.
U.S. Appl. No. 10/624,454, Final Rejection dated Jan. 7, 2009, 14 pgs.
U.S. Appl. No. 10/624,454, Final Rejection dated Oct. 21, 2009, 11 pgs.
U.S. Appl. No. 10/624,454, Issue Notification dated Aug. 18, 2010, 1 pg.
U.S. Appl. No. 10/624,454, Notice of Allowance dated May 27, 2010, 6 pgs.
U.S. Appl. No. 10/624,454, Office Action dated Feb. 2, 2010, 10 pgs.
U.S. Appl. No. 10/624,454, Office Action dated Jul. 24, 2008, 12 pages.
U.S. Appl. No. 10/624,454, Office Action dated May 1, 2009, 13 pgs.
U.S. Appl. No. 10/624,454, Office Action dated Oct. 2, 2007, 16 pgs.
U.S. Appl. No. 10/367,597, Final Rejection dated Feb. 27, 2008, 5 pgs.
U.S. Appl. No. 10/367,597, Issue Notification dated Sep. 17, 2008, 1 pg.
U.S. Appl. No. 10/367,597, Notice of Allowance dated May 29, 2008, 6 pgs.
U.S. Appl. No. 10/367,597, Office Action dated Oct. 5, 2007, 7 pgs.
U.S. Appl. No. 10/448,249, Advisory Action dated May 2, 2008, 3 pgs.
U.S. Appl. No. 10/448,249, Final Rejection dated Feb. 6, 2008, 18 pages.

(56) References Cited

OTHER PUBLICATIONS

U.S. Appl. No. 10/448,249, Final Rejection dated Jun. 5, 2009, 34 pgs.
U.S. Appl. No. 10/448,249, Office Action dated Aug. 15, 2007, 19 pages.
U.S. Appl. No. 10/377,584, Final Rejection dated May 11, 2006; 6 pages.
U.S. Appl. No. 10/377,584, Notice of Allowance dated Oct. 2, 2006; 4 pages.
U.S. Appl. No. 10/377,584, Office Action dated Nov. 17, 2005; 8 pages.
U.S. Appl. No. 10/377,280, Advisory Action dated Jan. 15, 2010.
U.S. Appl. No. 10/377,280, Final Rejection dated Feb. 15, 2008.
U.S. Appl. No. 10/377,280, Final Rejection dated Nov. 2, 2009.
U.S. Appl. No. 10/377,280, Notice of Allowance dated Feb. 25, 2009.
U.S. Appl. No. 10/377,280, Notice of Allowance dated Nov. 26, 2010, 17 pgs.
U.S. Appl. No. 10/377,280, Notice of Allowance dated Sep. 10, 2010.
U.S. Appl. No. 10/377,280, Office Action dated Apr. 16, 2009.
U.S. Appl. No. 10/377,280, Office Action dated Aug. 26, 2008.
U.S. Appl. No. 10/377,280, Office Action dated Jul. 25, 2007.
U.S. Appl. No. 10/356,688 Final Office Action dated Jan. 25, 2006; 15 pages.
U.S. Appl. No. 10/356,688 Final Office Action dated Jun. 5, 2007; 15 pages.
U.S. Appl. No. 10/356,688 Final Office Action dated Dec. 31, 2007; 14 pages.
U.S. Appl. No. 10/356,688 Issue Notification dated Oct. 29, 2008; 1 page.
U.S. Appl. No. 10/356,688 Notice of Allowance dated Jul. 9, 2008; 12 page.
U.S. Appl. No. 10/356,688 Office Action dated Jun. 19, 2006; 13 pages.
U.S. Appl. No. 10/356,688 Office Action dated Jul. 29, 2005; 15 pages.
U.S. Appl. No. 10/356,688 Office Action dated Nov. 27, 2006; 14 pages.
U.S. Appl. No. 10/356,338; Final Office Action dated Mar. 14, 2012; 29 pages.
U.S. Appl. No. 10/356,338; Issue Notification dated Aug. 28, 2013; 1 page.
U.S. Appl. No. 10/356,338; Notice of Allowance dated May 13, 2013; 28 pages.
U.S. Appl. No. 10/356,338 Office Action dated Aug. 16, 2011; 25 pages.
U.S. Appl. No. 10/356,338 Final Office Action dated Mar. 29, 2011; 25 pages.
U.S. Appl. No. 10/356,338 Non-Final Office Action dated Dec. 30, 2008; 43 pages.
U.S. Appl. No. 10/854,774; Final Office Action dated Jul. 5, 2011; 39 pages.
U.S. Appl. No. 10/676,418, Final Rejection dated Aug. 9, 2006, 14 pages.
U.S. Appl. No. 10/676,418, Notice of Allowance dated Oct. 19, 2006, 12 pages.
U.S. Appl. No. 10/676,418, Office Action dated Feb. 23, 2006, 16 pages.
U.S. Appl. No. 10/676,418, Issue Notification dated Feb. 28, 2007, 1 page.
U.S. Appl. No. 10/445,275, Notice of Allowance dated Jul. 12, 2007, 6 pages.
U.S. Appl. No. 10/445,275, Office Action dated Aug. 25, 2006, 9 pages.
U.S. Appl. No. 10/445,275, Office Action dated May 1, 2007, 4 pages.
U.S. Appl. No. 10/676,429; Final Office Action dated Feb. 13, 2012; 30 pages.
U.S. Appl. No. 10/676,429; Issue Notification dated Jun. 26, 2013; 1 page.
U.S. Appl. No. 10/676,429; Notice of Allowance dated Mar. 12, 2013; 41 pages.
U.S. Appl. No. 10/676,429; Non Final Office Action Oct. 3, 2011; 29 pages.
U.S. Appl. No. 10/676,429, Advisory Action dated Aug. 11, 2009, 3 pages.
U.S. Appl. No. 10/676,429, Advisory Action dated Jul. 2, 2010, 3 pages.
U.S. Appl. No. 10/676,429, Final Rejection dated Apr. 13, 2010, 34 pages.
U.S. Appl. No. 10/676,429, Final Rejection dated Jun. 9, 2009, 35 pages.
U.S. Appl. No. 10/676,429, Final Rejection dated Sep. 26, 2008, 22 pages.
U.S. Appl. No. 10/676,429, Office Action dated Mar. 17, 2008, 24 pages.
U.S. Appl. No. 10/676,429, Office Action dated Mar. 5, 2009, 43 pages.
U.S. Appl. No. 10/676,429, Office Action dated Oct. 14, 2009, 34 pages.
U.S. Appl. No. 10/676,429, Office Action dated Sep. 28, 2010, 29 pages.
U.S. Appl. No. 10/676,429, Final Office Action dated Mar. 3, 2011, 33 pages.
U.S. Appl. No. 10/676,429, Notice of Panel Decision dated Jun. 16, 2011, 2 pages.
U.S. Appl. No. 12/841,877; Final Rejection dated Oct. 10, 2012; 15 pages.
U.S. Appl. No. 12/841,877; Non Final Office Action dated Feb. 2, 2012; 13 pages.
U.S. Appl. No. 12/841,877; Non-Final Rejection dated Jun. 17, 2013; 16 pages.
U.S. Appl. No. 10/854,738; Issue Notification dated Oct. 12, 2011; 1 page.
U.S. Appl. No. 10/854,738, Final Rejection dated Jul. 23, 2009, 19 pages.
U.S. Appl. No. 10/854,738, Office Action dated Apr. 28, 2010, 21 pages.
U.S. Appl. No. 10/854,738, Office Action dated Jan. 5, 2009, 19 pages.
U.S. Appl. No. 10/854,738, Office Action dated Jun. 25, 2008, 21 pages.
U.S. Appl. No. 10/854,738, Final Rejection dated Oct. 14, 2010, 19 pages.
U.S. Appl. No. 10/854,738, Notice of Allowance dated Jun. 23, 2011, 8 pages.
U.S. Appl. No. 10/854,738, Office Action dated Mar. 14, 2011, 14 pages.
U.S. Appl. No. 11/670,923, Notice of Allowance dated Feb. 7, 2008, 12 pages.
U.S. Appl. No. 11/670,923, Office Action dated Sep. 4, 2007, 4 pages.
U.S. Appl. No. 11/670,923, Issue Notification dated May 28, 2008, 1 page.
U.S. Appl. No. 13/915,930; Non-Final Rejection dated Oct. 25, 2013; 65 pages.
ATM access network architecture; Meada, Y.; Kikuchi, K.; Tokura, N.: Communications, 1991. ICC 91, Conference Record; IEEE International Conference on Jun. 23-26, 1991; Pates 687-691 vol. 2; Digital Object Identifier 1031109/ICC.1991.162450.
U.S. Appl. No. 10/356,338; Final Rejection dated Jul. 7, 2009; 27 pages.
U.S. Appl. No. 10/356,338; Non-Final Rejection dated Oct. 26, 2010; 23 pages.
U.S. Appl. No. 10/444,941; Corrected Notice of Allowability dated Mar. 20, 2014; 9 pages.
U.S. Appl. No. 10/444,941; Issue Notification dated Apr. 9, 2014; 1 page.
U.S. Appl. No. 10/444,941; Notice of Allowance dated Dec. 5, 2013; 25 pages.

(56) References Cited

OTHER PUBLICATIONS

U.S. Appl. No. 10/652,718; Issue Notification dated Jan. 29, 2014; 1 page.
U.S. Appl. No. 10/652,718; Notice of Allowance dated Oct. 16, 2013; 18 pages.
U.S. Appl. No. 10/652,718; Notice of Appeal Decision dated Jun. 21, 2013; 10 pages.
U.S. Appl. No. 12/841,877; Final Rejection dated Jan. 6, 20014; 15 pages.
U.S. Appl. No. 13/541,839; Non-Final Office Action dated Feb. 21, 2014; 16 pages.
U.S. Appl. No. 13/827,163; Continuation-in-part Application filed Mar. 14, 2013; 63 pages.
U.S. Appl. No. 13/915,930; Final Rejection dated Mar. 18, 2014; 46 pages.
U.S. Appl. No. 13/915,930; Interview Summary dated Aug. 22, 2014; 3 pages.
U.S. Appl. No. 13/915,930; Pre-Appeal Decision dated Jun. 27, 2014; 2 pages.
U.S. Appl. No. 13/541,839; Final Rejection dated Dec. 16, 2015; 14 pages.
U.S. Appl. No. 13/541,839; Notice of Panel Decision from Pre-Appeal Brief Review dated Feb. 4, 2016; 2 pages.
U.S. Appl. No. 13/827,163; Notice of Allowance dated Mar. 10, 2016; 21 pages.
U.S. Appl. No. 13/965,830; Non-Final Rejection dated Feb. 25, 2016; 47 pages.
U.S. Appl. No. 13/541,839; Notice of Allowance dated Jul. 15, 2016; 13 pages.
U.S. Appl. No. 13/965,830; Final Rejection dated Oct. 6, 2016; 29 pages.
U.S. Appl. No. 13/541,839; Non-Final Rejection dated Mar. 29, 2016; 14 pages.
U.S. Appl. No. 14/261,219; Non-Final Rejection dated May 25, 2016; 57 pages.
U.S. Appl. No. 13/827,163; Issue Notification dated Jun. 22, 2016; 1 page.
U.S. Appl. No. 14/261,219; Final Rejection dated Jan. 26, 2017; 38 pages.
U.S. Appl. No. 15/295,510; Non-Final Rejection dated Mar. 1, 2017; 13 pages.
U.S. Appl. No. 15/295,510; Notice of Allowance dated Apr. 3, 2017; 12 pages.
U.S. Appl. No. 13/541,839; Issue Notification dated Oct. 26, 2016; 1 page.
U.S. Appl. No. 13/965,830; Non-Final Rejection dated Jun. 15, 2017; 26 pages.
U.S. Appl. No. 14/261,219; Non-Final Rejection dated Aug. 7, 2017; 33 pages.

\* cited by examiner

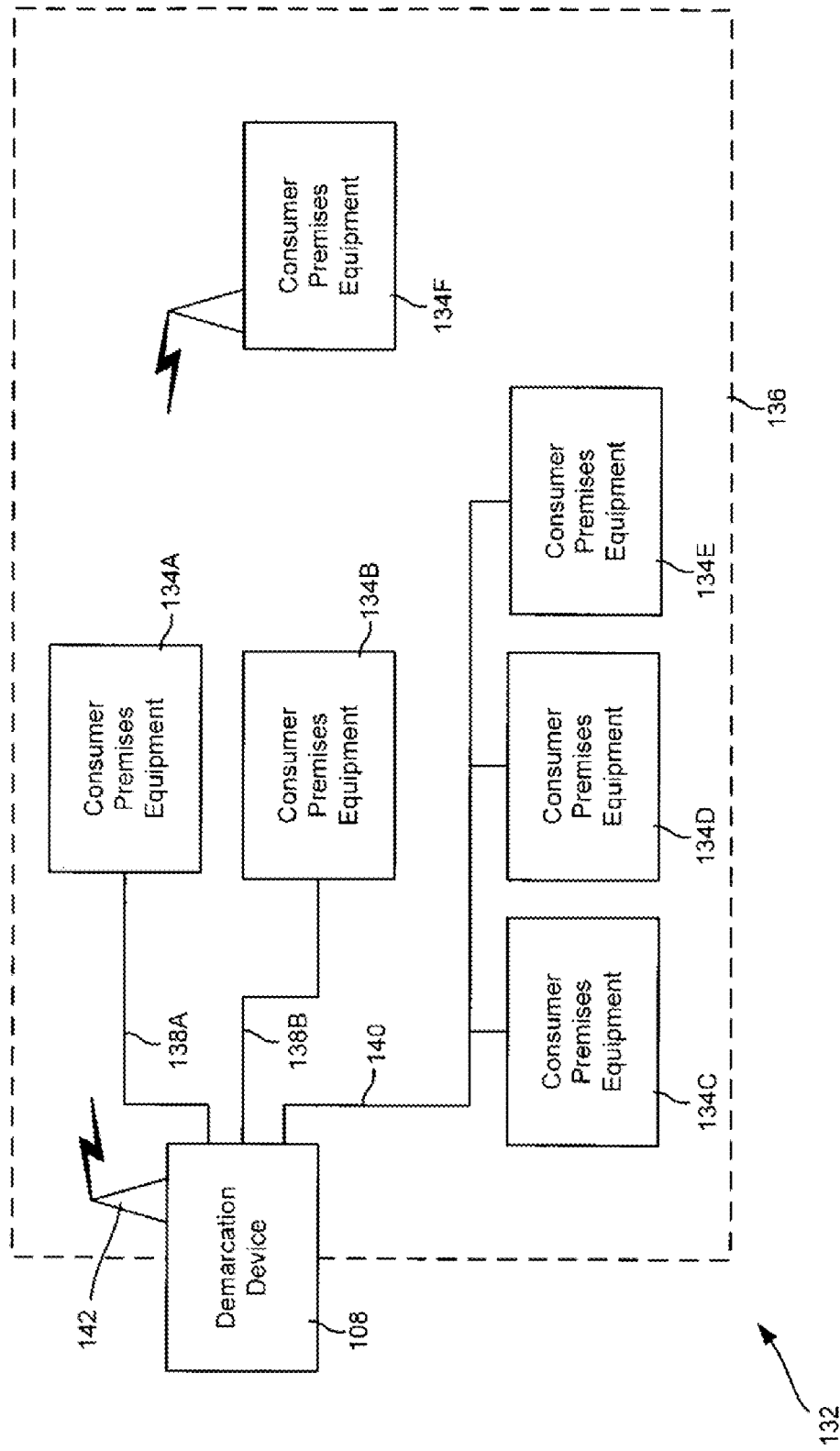

ANTENNA SYSTEM AND METHODS FOR WIRELESS OPTICAL NETWORK TERMINATION

CROSS REFERENCE TO RELATED APPLICATIONS

This application is a continuation-in-part of co-pending U.S. patent application Ser. No. 13/965,830, filed Aug. 13, 2013 by Bruce A. Phillips et al. and entitled, "Multiple-Enclosure Residential Gateways", which is hereby incorporated by reference in its entirety for all matters disclosed therein.

This application may also be related to U.S. patent application Ser. No. 13/827,163, filed Mar. 14, 2013 by Robert J. Morrill et al. and entitled, "Multi-Service Provider Wireless Access Point", and U.S. patent application Ser. No. 13/541,839, filed Jul. 5, 2012 by Charles Ivan Cook and entitled, "Multi-Service Provider Wireless Access Point", both of which are hereby incorporated by reference in their entirety for all matters disclosed therein.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to optical network termination systems and methods and more particularly, to devices and techniques that enable an optical network terminal (ONT) with a distributed antenna to be provided and powered at a customer location with minimal cabling and minimal installation activity.

BACKGROUND

Fiber optic technologies may be used to transmit signals of various types from an external telecommunications network to a customer premises. The signals which can be multiplexed and transmitted over an optical fiber may include, but are not limited to, voice telephone signals, television/video signals or data. Unlike many other technologies, an optical fiber does not provide power for signal demultiplexing, signal conversion or signal transmission to customer equipment. In addition, an optical signal is not typically suitable for direct connection to customer equipment. Therefore, an optical network terminal (ONT) is used to terminate the fiber optic line at the premises and demultiplex the optical signal into its component parts for subsequent transmission into the premises over many types of non-optical transmission medium. An ONT may have as an input a single optical fiber in communication with various external network elements. In addition, as used herein, an ONT is any device that terminates fiber from the network for the purpose of communications. Point-to-Point optical access and WDM technologies can utilize an ONT as can PON (Passive Optical Network) technologies such as APON, BPON, EPON, GPON, NGPON2 and similar communications technologies.

The output from the ONT may include one or more unshielded twisted pairs of copper wire or Category 3 cabling for the transmission of voice telephone services or data, one or more Category 5, 5e, 6, 6e, 7 or another multi-wire cabling outputs for the transmission of voice, data or video and/or one or more coaxial cable outputs for the transmission of data, voice or video signals to equipment within the customer premises.

In many instances, an ONT is included within a network interface device (NID). A NID is typically implemented as a relatively small weather-proof box mounted on or near the outside of a building, which serves as the demarcation point between a service provider's network and a customer's in-premises equipment.

With respect to a NID including an ONT however, the device must derive its power from the customer premises electrical supply in some fashion. Thus, the services of an electrician and/or the installation of additional power cabling becomes necessary to provide power to the ONT. Furthermore, many homes built in the past include only in-wall unshielded twisted pair phone lines or Category 3 twisted-pair cabling which terminates in a conventional telephone NID and provides only for basic telephone services. These somewhat older homes, do not have preinstalled in-wall Category 5, 6 or 7 data cabling and/or in-wall coaxial cable networks. Accordingly, retrofitting such homes with an ONT designed to provide broadband data services or high quality video requires substantial cable installation between the ONT and interior of the customer premises. Re-cabling a customer's premises can be expensive, time consuming and intrusive.

Hence, there is a need for solutions that can overcome the above and other technical hurdles to enable an ONT to be provided and powered at a customer location with minimal cost, minimal intrusion and minimal additional cabling.

BRIEF SUMMARY

Various embodiments disclosed herein include systems, apparatus and methods for terminating an optical network and providing wireless access to telecommunications signals, including broadband telecommunications signals, to devices located within a customer premises. One embodiment disclosed herein is an optical network termination system including an optical fiber in communication with an external telecommunications information network. The system also includes an optical network terminal (ONT) having processor in communication with the optical fiber. The processor provides for the processing of telecommunications information conveyed over the optical fiber to or from the external network and therefore includes modules to accomplish signal multiplexing or demultiplexing, signal conversion or signal transmission to both the external network and to customer equipment along with other necessary ONT functions.

The processor may be located at or near a customer premises, for example within a network interface device (NID) typically mounted to an exterior wall of the premises but which could be located anywhere at or near the customer premises. The premises may be a customer building or collection of customer buildings of any type including but not limited to one or more homes, businesses, offices buildings, schools, medical facilities or the like.

The processor functions to terminate the external optical network and communicate telecommunication signals of any type including but not limited to voice, video or data signals. Accordingly, the processor communicates with various internal transport media to convey signals from the processor to devices. In particular, the optical network termination system also includes two or more internal transport media in communication with the processor. The two or more internal transport media include at least one electrically conductive internal transport medium which may be implemented with any conductive media, including but not limited to unshielded twisted pairs of copper wire or Category 3 cabling, one or more of Category 5, 5e, 6, 6e, 7 or another multi-wire cabling, Token Ring™ cable, coaxial cable or another type of electrically conductive cabling. At least one other internal transport medium is wireless and therefore is implemented with a wireless access point in communication with the processor. In use, either or both of the wireless and the electrically conductive internal transport medium may convey some portion or the entire telecommunications signal to or from the premises.

Electrical power cannot be transmitted over an optical fiber. The wireless transmitter of the wireless internal transport medium and the processor of the ONT require electric power to operate. The embodiments disclosed herein provide electric power to at least the wireless transmitter and in certain instances to the processor over the electrically conductive internal transport medium. Thus, power to the wireless transmitter and potentially the processor is provided from within the premises. In certain specific embodiments, power is supplied over the electrically conductive internal transport medium from a power supply connected to an AC power outlet located within the premises.

In particular, selected system embodiments may include a power supply configured to be connected to an AC outlet within the premises and a back-power cable providing for the transmission of power from the power supply to the wireless access point (and possibly other system elements) over the electrically conductive internal transport medium. In one embodiment, the back power cable from the power supply is terminated with a plug, jack or other port which may be connected to an appropriate receptacle in electrical communication with the conductive internal transport medium. For example, the power supply may be connected to a Category 3 cable network within the customer premises at an RJ-11 telephone socket using an RJ-11 telephone jack terminating the back power cable from the power supply.

The power supply and back-power cable may be associated with an uninterruptible power supply in certain embodiments to assure that power is continuously supplied to the wireless access point or processor in the event of an AC power failure at the premises. In some embodiments, the wireless access point may be in wireless communication with a residential gateway within the premises which operates to distribute telecommunication signals of the various types over wired or wireless media to devices within the customer premises.

In one specific embodiment, the wireless access point and potentially other ONT elements are powered over a Category 3 telephone cable which otherwise serves to communicate telephone signals to one or more telephones within the customer premises. In this specific embodiment, the processor may include a POTS pass-through circuit providing for telephone signals received at the processor to be passively sent to the cabled telephone system within the premises whether or not the telephone cable is being used to back power a wireless access point or other ONT elements.

The system may also include a detection circuit providing for the detection of one twisted-pair of the Category 3 telephone cable (or other electrically conductive internal transport medium) which is not being used to convey telecommunications information. The detection circuit may then actively route back-power current to wires which are not being used to convey telecommunications information. Alternatively, if back-power is provided over a cable or wires which are used to convey telecommunications information, the system may include one or more regeneration and/or isolation modules to isolate devices, such as a customer telephone, from back-power current and to regenerate telecommunications signals as necessary.

As noted above, telecommunication signals of any type can be conveyed into the customer premises from the wireless access point. Accordingly, the wireless access point must have a suitable antenna. In some embodiments the antenna is located on or within the wireless access point housing. In such an embodiment, the antenna may be located, for example, within a network interface device mounted to the exterior of the customer premises. A single antenna located at the wireless access point may be insufficient to provide adequate coverage for all desired customer devices however, particularly where the customer premises is large or where several intervening walls and floors exist between the wireless access point and selected customer devices.

Accordingly, in selected embodiments, the system may include a distributed antenna. A distributed antenna comprises a feed line which originates at the wireless access point and extends around or through one or more of the walls of the customer premises. Alternatively, the feed line may extend to selected locations within the customer premises. The feed line serves to feed radio signals to one or more radiating elements which are positioned around, on or in the exterior walls of the customer premises or position at selected locations within the customer premises, as needed to assure adequate wireless coverage for all devices.

Alternative embodiments include network interface devices and methods of terminating an optical network and providing wireless services to a premises as described herein.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 1A-1G illustrate systems used for demarcation devices according to certain disclosed embodiments.

DETAILED DESCRIPTION OF CERTAIN EMBODIMENTS

Figure 1A:
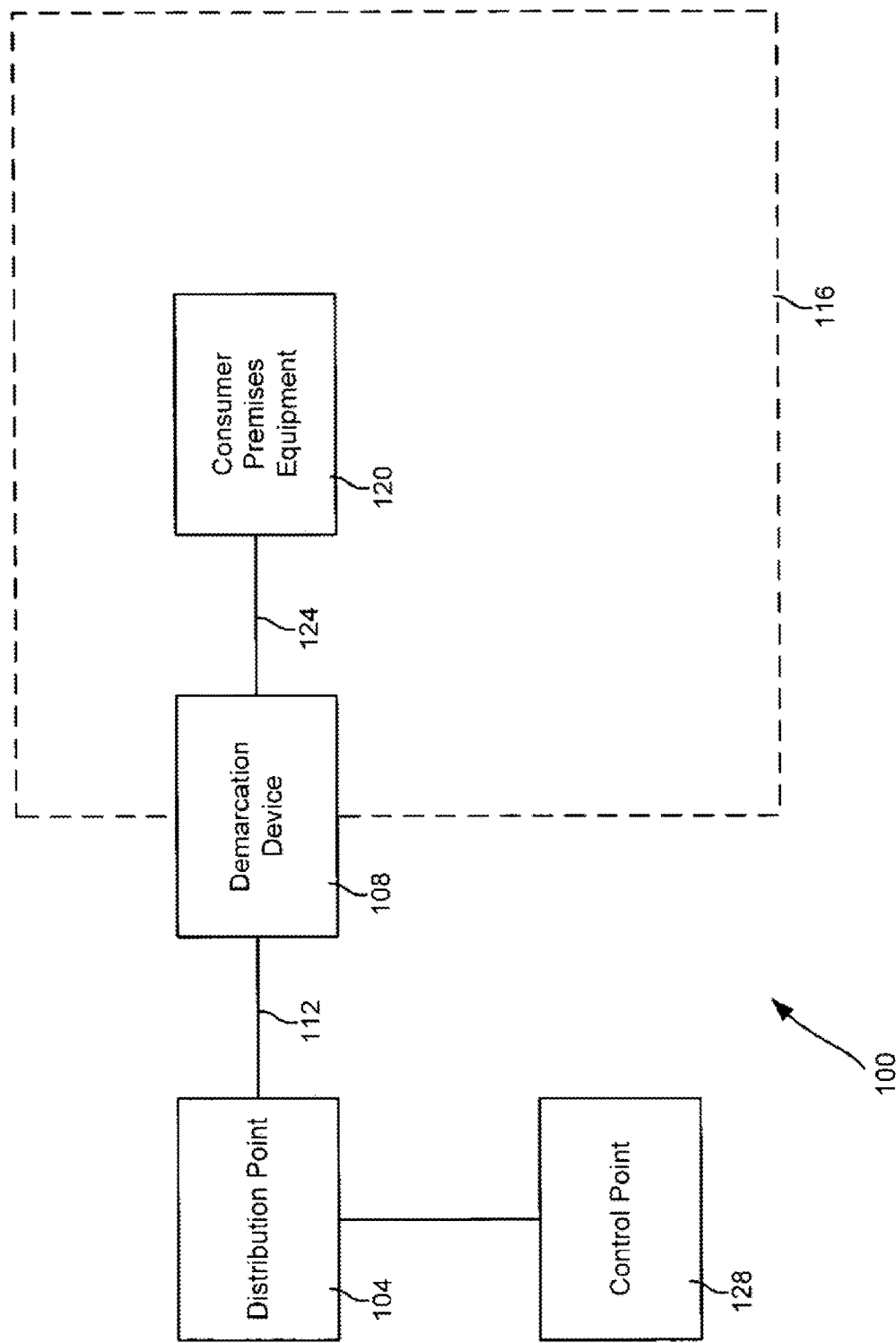

Certain embodiments of the present invention are directed to demarcation devices that can be used to provide telecommunication services, as well as to methods and systems of using such devices. A demarcation device can be any device capable of serving as an interface between a customer premises and a telecommunication service provider's network. Such devices can include, merely by way of example, set top boxes (which can be used, inter alia, as an interface between a customer's video appliance and a provider's video network), broadband modems (including xDSL modems, cable modems and wireless modems, each of which can be used to provide video and/or data to a customer premises), integrated access devices (which can, for instance, translate between Voice over IP ("VoIP") signals and traditional telephone signals, thus allowing traditional telephones to connect to a VoIP network), devices compatible with the session initiation protocol ("SIP") familiar to those skilled in the art, and/or the like. One particular demarcation device is a network interface device ("NID"), described in detail below. In certain aspects, demarcation devices can be used to separate received telecommunication information into discrete sets, and optionally to process certain of those sets independently from other sets and/or transmit different sets to different locations, perhaps through the use of different interfaces.

As used herein, references to the term "telecommunication information" should be interpreted to include any information that can be transmitted or carried by a telecommunication service provider's network (e.g., the Public Switched Telephone Network or "PSTN") or by any other telecommunication network, including but not limited to the Internet. Such information includes, for example, voice signals (e.g., Plain Old Telephone Service or "POTS," as the term is known to those skilled in the art), audio and video signals (encoded in any standard and/or proprietary, digital and/or analog format now known or hereafter developed, using any of a variety of means known to those skilled in the art, such as HDTV, NTSC and PAL formatting, as well as, for example, any of the MPEG digital encoding and/or compression algorithms), and data. Such data can be formatted according any of a variety of protocols familiar in the art, including in particular any of the protocols known in the art as part of the TCP/IP suite, in particular the Internet Protocol ("IP"). Data can also include infrastructural protocols, including, for instance, routing protocols and protocols necessary to implement advanced networking schemes known to those skilled in the art, such as multiprotocol label switching ("MPLS"), Ethernet in the first mile ("EFM"), to name but two In this document, the term "telecommunication service provider" can mean any entity that provides telecommunication service to a customer's premises, including, merely by way of example, incumbent local exchange carriers, competitive local exchange carriers, cable television carriers, and satellite providers, to name a few. In contrast, the term "telecommunication information provider," means any entity that is capable of serving as a source of telecommunication information. In many cases, a particular entity may be considered both a telecommunication service provider and a telecommunication information provider, for instance, when a local exchange carrier provides Internet service to a customer, as well as the external transport medium attached to that customer's premises. In other cases, the two may be separate entities. For instance, according to certain embodiments of the invention, a cable television provider could contract with a local exchange carrier to provide broadcast television signals to a customer premises using the local exchange carrier's network and/or an external transport medium operated by the local exchange carrier.

The term "telecommunication information set" is used to describe a discrete subset of the telecommunication information transmitted across a particular transport medium and/or received by a demarcation device. Generally, the telecommunication information that is classified part of a particular information set shares a common characteristic. Merely by way of example, an information set can comprise telecommunication information of a particular type (e.g., voice, IP data, encoded video, and such), information associated with a particular application (e.g., information assigned to a specific IP port, as is known in the art, or information used by a particular software and/or hardware program), information addressed to or received from a particular device or network segment, information received within a particular reception window, and the like.

In certain embodiments, demarcation devices can support the one-way flow of telecommunication information, as for example, in the case of a simple set top box, which can receive data representing a video signal, decode that data, and transmit a video signal to an attached television. In other embodiments, however, demarcation devices can support bidirectional flow of telecommunication information. For example, an xDSL modem allows the transmission of data both to and from a customer premises. In still other embodiments, a demarcation device can be configured to support both unidirectional and bidirectional information flows simultaneously, depending on the type of telecommunication information transmitted or the source of the information.

In one important aspect, demarcation devices can function to isolate the telecommunication service provider's network from the network at the customer premises. As described in detail below, the service provider's network can be thought of as an "external transport medium," while the customer's network can be termed an "internal transport medium." Both external transport media and internal transport media are types of "transport media," a term used in this document to describe any cable, wire or other medium capable of carrying telecommunication information, including, but not limited to, twisted pair copper wiring (shielded or unshielded, including, for example, unshielded cables complying with industry-standard categories 3, 5, 5e and 6 and shielded cables commonly known as Token Ring™ cables, to name a few), optical fiber (including both single-mode and multimode fiber, as well as doped fiber, wavelength-division multiplexed, coarse wavelength-division multiplexed, wide wavelength-division multiplexed, dense wavelength-division and ultra-dense wavelength-division multiplexed fiber) and coaxial cable.

Other examples of transport media can also include universal serial bus ("USB") cable, cable complying with the Institute of Electrical and Electronics Engineers' ("IEEE") 1394 standard, as well as any medium capable of complying with the many local area networking standards known in the art. Of course, a transport medium need not be a physical medium; it can also comprise any of a wide variety of wireless transmissions, including (but not limited to) infra-red transmissions, radio frequency ("RF") transmissions, and transmissions complying with standards developed by any of the IEEE's working groups governing wireless communication (e.g., the 802.11, 802.15, 802.16 and 802.20 working groups). Similarly, a transport medium can comprise other wireless technologies, such as point-to-point microwave, including local multipoint distribution system ("LMDS"), microwave multipoint distribution system and/or multipoint multi-channel distribution system (collectively, "MMDS") transmissions, and satellite, cellular/PCS, and/or ultra wideband transmissions, to name a few.

In certain embodiments, a demarcation device can act as an active demarcation point, serving to isolate the external transport medium from the internal transport medium (perhaps via an isolation device, discussed below), such that operational changes in one network do not affect the other network. "Operational changes" can include any changes in the structure, topology, format, protocol, bandwidth, media and/or other operational parameters of a network. This feature can provide many benefits; for instance, the demarcation device can serve as a disclosed interface between a customer premises and a provider's network, allowing the provider to implement changes in its network without disrupting the service provided to the customer.

Likewise, the isolation of the internal transport medium from the external transport medium can allow for any variety of customer premise equipment ("CPE") (which can be any device that sends, receives or otherwise utilizes telecommunication information) to be used at the customer premises without fear that the appliance might be incompatible with a particular telecommunication service provider's standards. Moreover, a demarcation device might serve to couple a plurality of external and/or internal transport media, allowing interoperation among them all, and provide the same isolation features among all of these media.

In this way, certain aspects of the demarcation devices can allow for sales of a wide variety of CPE on a consumer electronics model, instead of the proprietary model necessitated by many of today's telecommunication networks, where, for example, differing implementations of xDSL among providers virtually force consumers to purchase modems supplied or approved by a particular provider to ensure compatibility between the modem and the provider's xDSL implementation. By isolating the topologies of the external and internal transport media, embodiments of the present invention can create a disclosed interface between the provider's network and the customer's network, allowing much greater flexibility in both the provider's networking options and the customer's choice of telecommunication appliances. Those skilled in the art will recognize that these and many other benefits can flow from embodiments of the invention.

In accordance with other embodiments, the isolation abilities of demarcation devices also can allow a demarcation device to serve as an insulator between different transport media coupled to the internal and external transport media in order, for instance to prevent unwanted telecommunication information from one network from entering the other network. For instance, a demarcation device in accordance with particular embodiments can serve to prevent propagation of certain telecommunication information from an internal network (including particular signals or frequencies) into one or more external transport media, preventing interference in the internal transport medium from interfering with the telecommunication service provider's network. In similar fashion, demarcation devices can prevent the contamination of the internal transport medium with unwanted information from the external medium, interference between two or more external transport media coupled to a demarcation device, and unwanted interference or crosstalk between multiple internal media.

The ability of a demarcation device to isolate the internal transport medium from the external transport medium also allows demarcation devices in some embodiments to be used to provide enhanced security for the customer and/or control customer access to certain features or services. For instance, those skilled in the art will recognize that a demarcation device can prevent unauthorized access (by a telecommunication service provider and/or a third party) to the customer's data network, or can screen or filter telecommunication information entering or leaving the customer's premises, enabling features like parental controls on incoming and outgoing information, as well as the filtering of outgoing sensitive information (such as credit card information and the like).

Further, according to certain embodiments, the demarcation device, as the consolidation point for all telecommunication information entering or leaving the customer premises, can provide a variety of enhanced features to the entire premises, including things like caller identification, premises-wide telephone, video and data distribution, content (e.g., video, audio or data) on demand, and the like. These and other features of the demarcation devices also allow for a variety of new and useful telecommunication applications to be provided to customers. Details about some exemplary applications are discussed below; given the disclosure herein, those skilled in the art can appreciate the wide variety of such applications that are possible using various embodiments of the invention.

Certain embodiments of the invention provide a variety of systems for utilizing demarcation devices. Merely by way of example, FIGS. 1A-1G illustrate several such exemplary systems. For instance, FIG. 1A illustrates a system 100 for providing telecommunication services using a demarcation device, in accordance with some embodiments of the invention. System 100 includes a distribution point 104 in communication with a demarcation device 108 via external transport medium 112. In one sense, distribution point 104 can be considered the source of telecommunication information transmitted to customer premises and the recipient of telecommunication information transmitted from customer premises 116, although, as described below, distribution point 104 often will be neither the ultimate source nor the ultimate recipient of telecommunication information. In certain embodiments, distribution point 104 can be a telecommunication service provider's local office; in other embodiments, distribution point 104 can be another network element in the service provider's network, for instance, a remote termination cabinet and/or a digital subscriber line access multiplier ("DSLAM"). In fact, distribution point 104 can be any facility or equipment operated by a telecommunication service provider that is capable of transmitting telecommunication information to, and/or receiving telecommunication information from, a customer premises.

In general, distribution points can be classified, inter alia, as discrete distribution points or complex distribution points. With respect to a particular information set, a discrete distribution point often transmits only the necessary or desired information to the NID. In contrast, a complex distribution point can transmit the entire information set to the NID. The contrast may be illustrated with regard to video distribution: A discrete distribution point may perform channel switching (at the request of the demarcation device), encoding and sending only the desired channel information to the demarcation device. In contrast, a complex distribution point might rely upon the demarcation device to perform all channel switching. Those skilled in the art will appreciate that each scheme presents relative advantages and disadvantages.

Distribution point 104 can be capable of transmitting and/or receiving any type of telecommunication information to/from demarcation device 108, and such telecommunication information can be organized into a plurality of telecommunication information sets, as necessary. For ease of description, FIG. 1A does not show any additional sources or recipients of telecommunication information in communication with distribution point 104, but, those skilled in the art will recognize that, in many embodiments, distribution point 104 can be coupled to multiple customer premises (perhaps via a demarcation device at each customer premises) and often is neither the ultimate source nor the ultimate recipient of telecommunication information. Instead, distribution point 104 often can serve as the intermediary between one or more customer premises (e.g., 116) and one or more larger telecommunication networks and/or telecommunication information providers, which, as discussed above, can include cable television networks, telephone networks, data networks, and the like. Further, many such networks (as well as, in some embodiments, distribution point 104) can be coupled to the Internet, so that distribution point 104 can serve as a gateway between customer premises and any source and/or recipient of telecommunication information that has a connection to the Internet. The interconnection of telecommunication networks is well known in the art and need not be discussed here, other than to note that distribution point 104 can be configured to transmit telecommunication information to (and receive telecommunication information from) virtually any source or recipient of telecommunication information, through either direct or indirect (e.g., through the Internet) communication. Merely by way of example, a distribution point can transmit video signals received from a television programming provider to customer premises equipment, as described in the applications referenced above. In other embodiments, distribution point 104 can be in communication with one or more other customer locations, allowing for private virtual circuits between customer premises 116 and those locations.

In system 100, demarcation device 108 can serve as the interface between external transport medium 112 and customer premises 116. As conceptually illustrated in FIG. 1A, demarcation device 108 can be attached to an external wall of customer premises 116, which provides many advantages. For instance, if the telecommunication service provider desires to upgrade or otherwise change its network (including, perhaps, modifying external transport medium 112), a technician can perform any necessary changes at demarcation device 108 without entering the customer premises. Coupled with the ability of some demarcation devices to isolate the telecommunication service provider's network from the customer's premises, this can allow the telecommunication service provider to effect substantial changes in it network without impacting or inconveniencing the customer in any respect. This could, for example, allow the telecommunication service provider to upgrade external transmission medium 112 from a copper twisted pair to optical fiber, without requiring any topological changes inside the customer premises. Of course, demarcation device 108 also may be located at a variety of other locations, for example, within customer premises 116 or at a facility operated by the telecommunication service provider (e.g., distribution point 104). As discussed in detail below, a demarcation device may also be divided, with different portions situated at different locations, according to the requirements of the implementation.

Demarcation device 108 can communicate with CPE 120 (which can be located inside customer premises 116) through internal transport medium 124, which can comprise any of the media discussed above. In particular, internal transport medium 124 can comprise the existing telephone wiring in customer premises 116 and, in some embodiments, is capable of carrying voice, data and video information, as well, perhaps, as other types of telecommunication information, using any of a variety of multiplexing schemes. For instance, as described in Edward H. Frank and Jack Holloway, "Connecting the Home with a Phone Line Network Chip Set," *IEEE Micro* (IEEE, March-April 2000), which is incorporated herein by reference, the Home Phoneline Networking Alliance ("HPNA") standards allow for simultaneous transmission of both voice information and Ethernet frames across twisted-pair copper telephone wiring.

Thus, telecommunication information received by distribution point 104 from any source (for instance, those discussed above) can be transmitted from distribution point 104 through external transport medium 112 to demarcation device 108. Demarcation device 108 can then transmit the information through internal transport medium 124 to CPE 120. Likewise, telecommunication information can be transmitted via the reverse path to distribution point 104, where it can, for instance, be transmitted to an information recipient, such as a service provider (for instance, to request a pay-per-view movie or the like) or across the Internet to a recipient (such as in the case of an email message).

In certain embodiments, demarcation device 108 can receive configuration information, in some cases from a control point (e.g., 128), which, in the illustrated embodiment, is associated with distribution point 104. In certain instances, control point 128 can be software and/or hardware operated by a telecommunication service provider for controlling certain features of the operation of demarcation device 108. For instance, control point 128 can instruct demarcation device 108 to provide (or cease to provide) a particular telecommunication service (e.g., video distribution) to customer premises 116, or to control how many information sets and/or transport media demarcation device 108 should accept at any given time. Control point 128 can also provide other direction to demarcation device 108, including, for instance, instructions to save or record a particular information set (e.g., data representing a movie), such that the information set may quickly (and, in some cases), repeatedly be transmitted to customer premises 116, allowing the provision of voice, data, video, etc. on demand. Control point 128 can further be used to test the availability, functioning and/or performance of demarcation device 108, and/or any of the transport media attached thereto. Merely by way of example, control point 128 can be used to perform a loop test, known to those skilled in the art.

Often, it may be beneficial to allow the customer to provide configuration information to demarcation device 108. Thus, in certain embodiments, control point 128 can have a web interface, such that the customer (or any authorized person, such as an employee of the telecommunication service provider or telecommunication information provider) may log on to the web interface and configure options for demarcation device, perhaps resulting in configuration commands being transmitted from distribution point 104 to demarcation device 108. In other embodiments, control point 128 can be a web interface to demarcation device 108 itself, allowing the customer (or, alternatively, a telecommunication service provider or telecommunication information provider) to configure demarcation device 108 directly. In still other embodiments, control point 128 can communicate with demarcation device through an application programming interface ("API"). Hence, in some aspects, control point 128 can interface with demarcation device 108 through an API.

Those skilled in the art will recognize that, in some embodiments, an API can include a set of software, hardware or firmware routines or libraries that may be invoked programmatically to configure or relay information to demarcation device 108. In that sense, then, control point 128 can be understood to be a program running on a computer (perhaps located at distribution point 104 or customer premises 116, among other locations) that provides configuration information to demarcation device via using a software API. In other embodiments, however, an API can include a physical interface (perhaps adapted to communicate using any of the transport media discussed herein), that may be accessed remotely and/or locally, for instance, by a service technician.

Merely by way of example, a service technician could visit customer premises 116, attach a laptop computer (or other configuration device) to demarcation device 108, and upload information to demarcation device 108, including perhaps both configuration information and other telecommunication information. In still other embodiments, demarcation device 108 can accept configuration information through other means, including merely by way of example, providing a web interface (especially in embodiments where demarcation device 108 is capable of acting as a web server, as discussed below) and/or receiving a specially-formatted electronic message, either of which could be considered a control point in such embodiments.

As described below, demarcation device 108 (and/or particular components thereof) can be addressable/and or programmable (e.g., through control point 128). As such, demarcation device 108 can include a storage device, which can be any device known to those skilled in the art as one capable of storing information (including, merely by way of example, any of the memory and/or storage devices discussed below), for storing configuration information received from control point 128. As discussed below, the storage device can also store other telecommunication information.

Configuration information can be any set of data or other information that can be interpreted by demarcation device 108 as operational instructions, including, but not limited to, commands to process certain information sets in certain ways (e.g., provide protocol conversion, allow transmission of the information set, deny transmission of the information set, direct transmission on a particular interface, and the like), commands to provide (or cease providing) a particular service (e.g., to provide access to a pay per view movie or an additional telephone line). Thus, in certain aspects, a telecommunication service provider can control the services provided to a customer in several ways. First, the provider can transmit a telecommunication information set to a demarcation device only if the user of that device is authorized to receive the service associated with that information set. Alternatively, the service provider could send one or more services to a customer's demarcation device regardless of the customer's authorization to use the services, and rely on the device itself to prevent unauthorized access to those services.

Those skilled in the art will appreciate that certain control methods are more well-suited to certain services than to others. For instance, with respect to cable television services, the same set of information may be broadcast to many households, and the demarcation device is well-suited to control access to those services, allowing for greater efficiency in the providing of such services. In contrast, video on demand services may be controlled at a distribution point (or elsewhere), such that a demarcation device will only receive video on demand information if the customer already has requested (and been authorized to receive) that service, and the demarcation device thus may not need to provide access control functions with respect to that service.

According to some embodiments, demarcation device 108 can implement either of these access control schemes, or both in combination, as well as others. Moreover, demarcation device 108 can, in some cases, be configured to support a plurality of schemes transparently, so the customer can, for instance, request a service from demarcation device 108 (perhaps using one of the methods discussed above), and demarcation device can relay that request to the appropriate telecommunication service provider (and/or telecommunication information provider) if necessary, as well as reconfigure itself to allow access to that service, if necessary. Of course, demarcation device 108 also can be configured to take any necessary validating or authenticating action (such as notifying distribution point 104 and/or control point 128 that the service has been requested, and, optionally, receiving a return confirmation that the service has been authorized).

In accordance with other embodiments, configuration information sent to demarcation device 108 can include one or more commands to interface with and/or control a particular home fixture in a certain way. The term "home fixture" should be interpreted to mean any outlet, fixture, or device (including without limitation those that function electrically and/or any CPE) that can be intelligently controlled. Home fixtures can include, merely by way of example, any device, outlet, or other equipment that can be included in the "smart home" or "connected home" concepts familiar to those skilled in the art. For instance, configuration information could instruct demarcation device 108 to turn on and/or off certain lights, electrical outlets and/or equipment (perhaps via additional devices), and/or to arm, disarm or otherwise monitor and/or configure a home security system. One skilled in the art, will recognize, moreover, that although termed "home fixtures" for ease of description, home fixtures can easily be located in MDUs and business premises as well.

Configuration information can also include operational data such as an IP address, routing information, and the like, to name but a few examples. Configuration information can further include instructions to modify one or more security settings of demarcation device 108. Merely by way of example, in certain embodiments, demarcation device 108 can include a computer virus scanner, and configuration information can include updated virus definitions and/or heuristics. Likewise, demarcation device 108 often will be configured with access controls (for instance, to prevent unauthorized access through demarcation device 108 by third parties, as described elsewhere in this document), and configuration information can include instructions on how to deal with particular third party attempts to access demarcation device 108 or internal transport medium 124. Those skilled in the art will recognize as well that some security settings may specify the level of access the customer has to the functions of demarcation device 108, for instance to prevent unauthorized use of certain telecommunication services, and that these settings also may be modified by received configuration information.

Based on the disclosure herein, those skilled in the art will recognize that a wide variety of configuration information can be transmitted to demarcation device 108, including those examples discussed above. Moreover, some types of configuration information may be sent periodically to demarcation device 108 to ensure that the configuration of demarcation device is current. Those skilled in the art will also recognize that configuration information can, in a sense, be considered a subset of the broader category of telecommunication information.

Figure 1B:
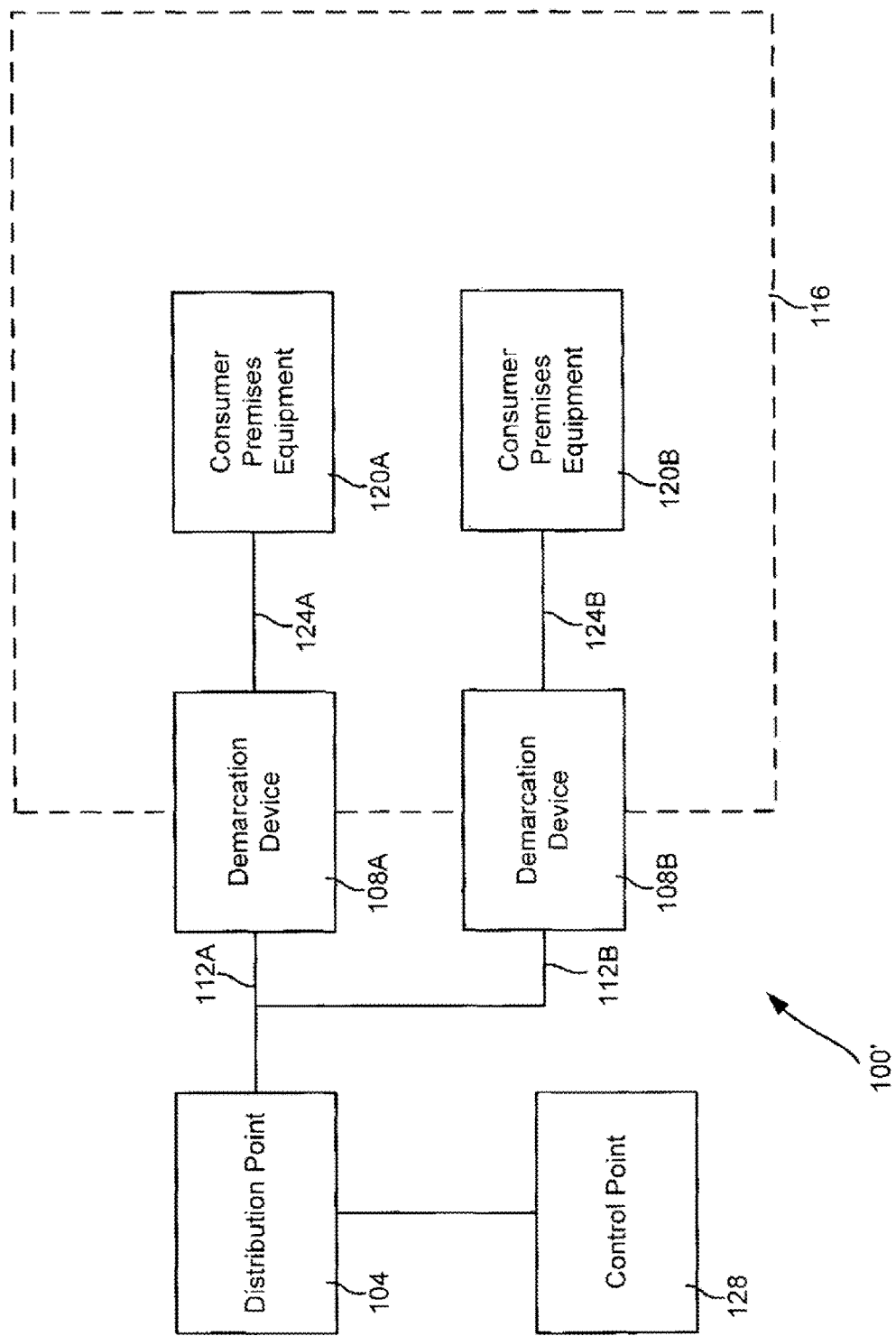

Turning now to FIG. 1B, system 100' is illustrative of certain embodiments, which can provide multiple demarcation devices 108A, 108B at customer premises 116. As noted above, demarcation device 108A can be in communication with CPE 120A through internal transport medium 124A, and demarcation device 108B likewise can be in communication with CPE 120B through internal transport medium 124B. Demarcation device 108B can communicate with distribution point 104 through external transport medium 112B which, as illustrated by FIG. 1B, can simply be spliced into external transport medium 112A (for example, using one or more active and/or passive splitting devices, which could be optical, as in a fiber environment, for example, or electrical). If necessary, demarcation devices 108 and/or distribution point 104 can include control logic to prevent unauthorized access by demarcation device 108A to telecommunication information sent to (or received from) demarcation device 108B, and vice-versa. In other embodiments, external transport medium 112B could run directly from demarcation device 108B to distribution point 104, or external transport medium 112B can be omitted, and demarcation device 108B can be coupled to demarcation device 108A, which can provide connectivity between demarcation device 108B and distribution point 104 through external transport medium 112A.

System 100' can be used in a variety of implementations. For instance, if customer premises 116 is a multiple-dwelling unit ("MDU") or a commercial building, separate demarcation devices can be provided for each separate resident, family and/or tenant (or, alternatively, a single demarcation device, perhaps with more interfaces, can service multiple dwelling or business units). In such implementations, especially when external transport medium 112B does not directly couple demarcation device 108B to distribution point 104, demarcation devices 108A, 108B can include security functionality, for example to prevent telecommunication signals intended for CPE 120A from reaching CPE 120B and vice-versa. In some embodiments, demarcation devices can provide a variety of such security, encryption and authentication functions.

Figure 2A:
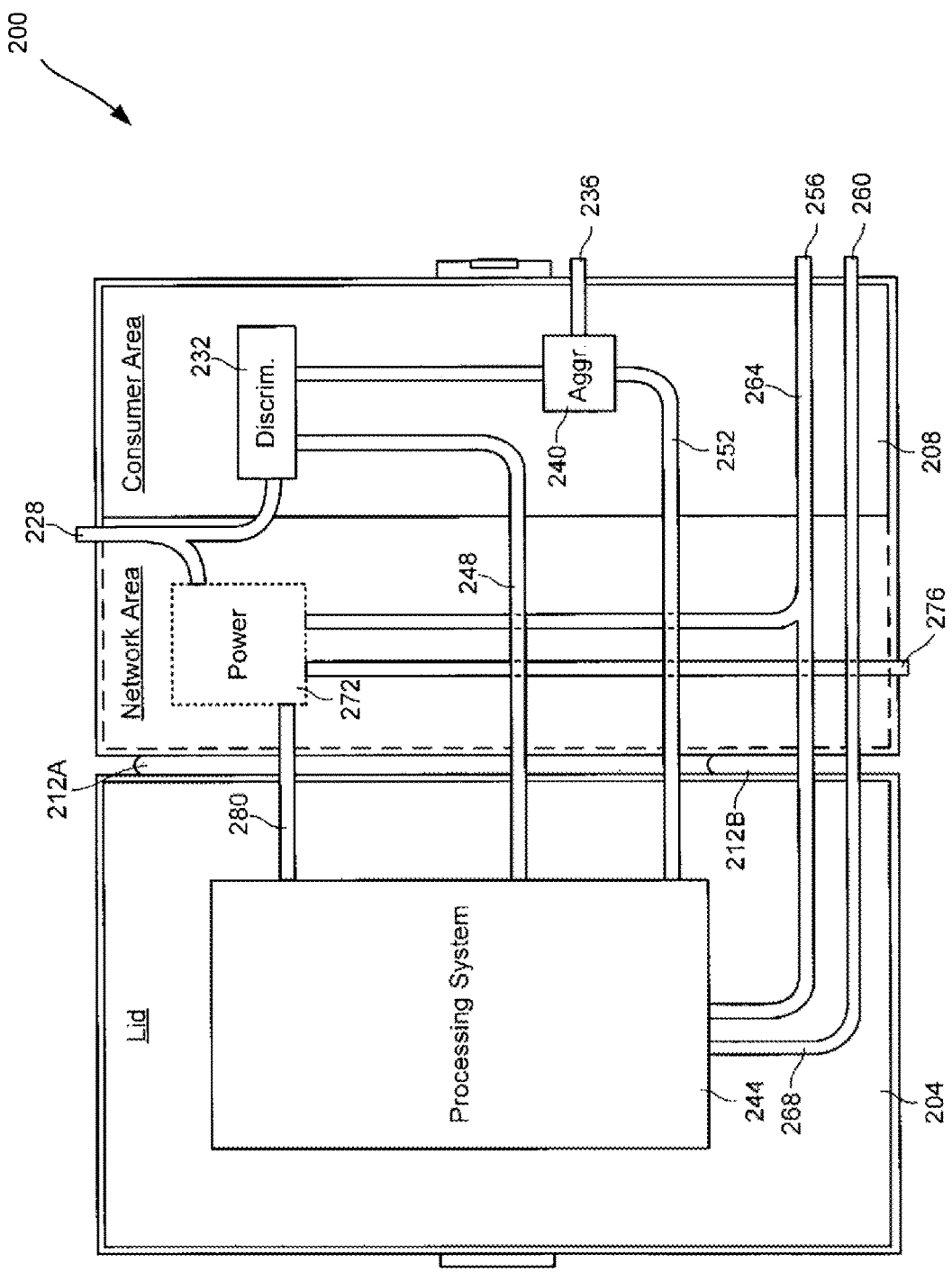
FIG. 2A illustrates a network interface device according to certain disclosed embodiments.

As described above, in certain embodiments, multiple demarcation devices 108A, 108B can be daisy-chained together (using any of the telecommunication media discussed herein). This could allow a telecommunication service provider to provide service to additional customers without requiring any additional external transport media (e.g., 112B). Similarly, demarcation devices at multiple premises can be coupled together (using wired or wireless transport media), such that if the external transport medium coupled to one of the demarcation devices fails, that device can maintain connectivity to the distribution point through its connection to another demarcation device. A demarcation device in accordance with specific embodiments thus may have an interface for securely connecting to one or more additional demarcation devices (thus, perhaps, forming a mesh network of one or more demarcation devices and/or distribution points), that would allow a particular demarcation device to serve as a conduit between another interface device and a distribution point, without allowing any unauthorized reception of telecommunication information intended for the connected interface device. This secure interface can be included, for instance, in a portion of the demarcation device that is inaccessible to customers, as illustrated in FIG. 2A and described below.

Figure 1C:
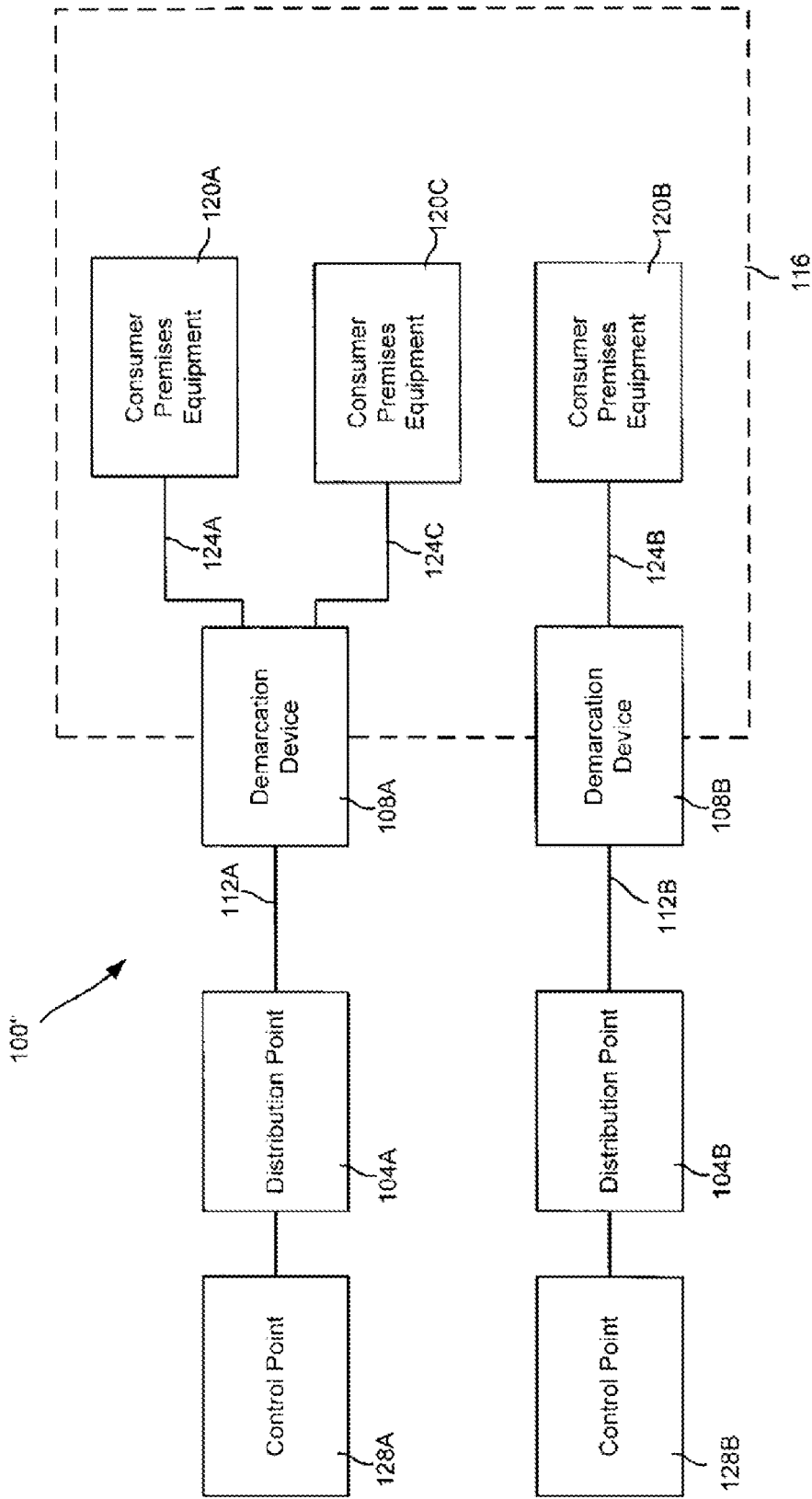

In other embodiments, a single customer premises might have connections to a plurality of telecommunication service providers. For example, turning now to FIG. 1C, system 100" includes a distribution point 104A coupled to demarcation device 108A and also includes a second distribution point 104B coupled to demarcation device 108B via external transport medium 112B. Merely by way of example, distribution point 104B could, for example, be associated with a cable television provider, while distribution point 104A could be associated with a telephone company. Thus, CPE 120A could be a telephone, and CPE 120B could be a television. (Of course, it should be noted that both telephone and video signals, as well as other forms of telecommunication information, can be provided through a single distribution point as well.) Further, as illustrated by example system 100", multiple CPE 120A, 120C can be coupled to a single demarcation device 108 (either through two internal transport media 124A, 124C as illustrated by FIG. 1C, or through a common internal transport medium, as discussed below). As described above, each demarcation device 108A, 108B, can receive configuration information from a control point 128A, 128B respectively.

Figure 1D:
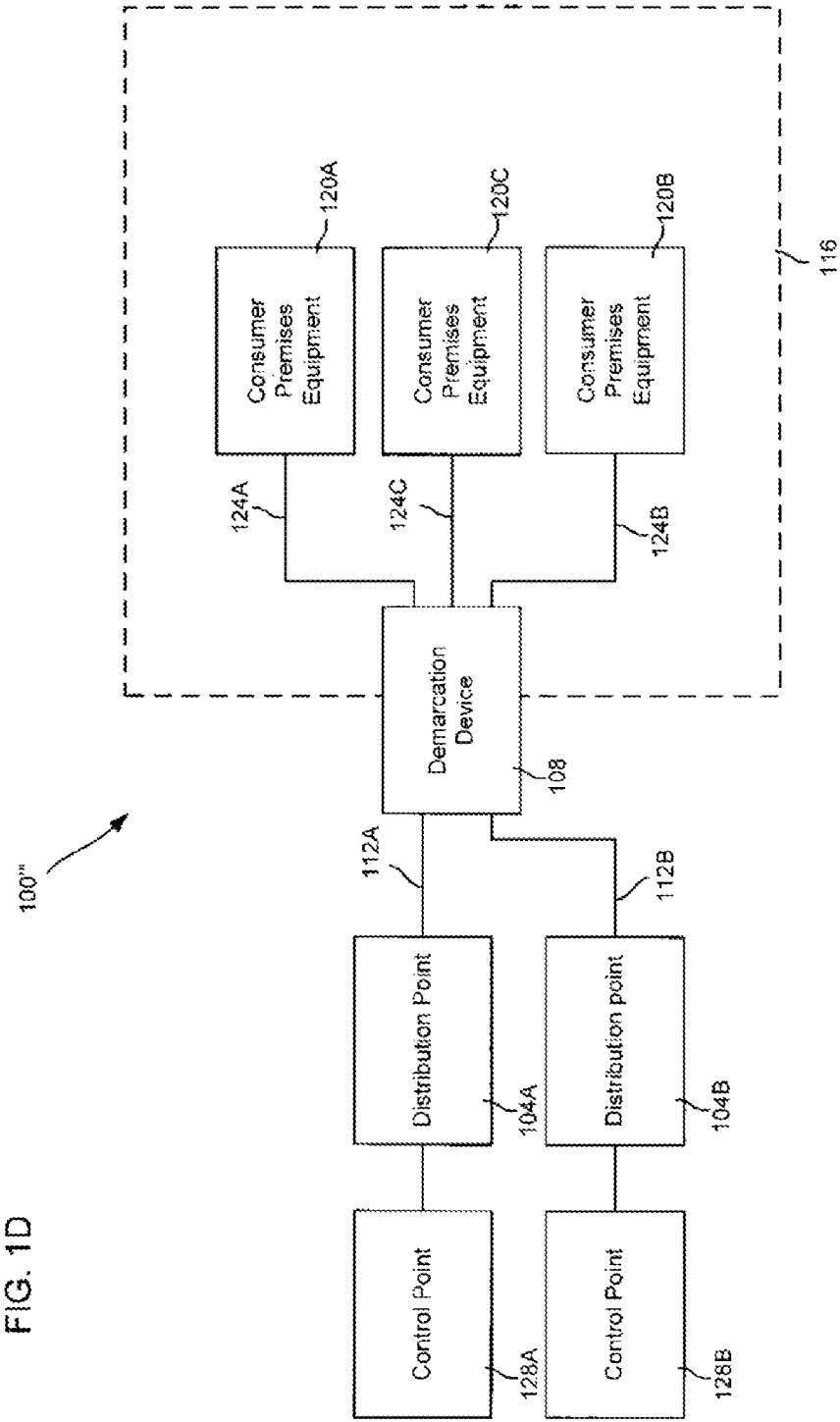

In an alternative embodiment, such as, for example system 100''' illustrated on FIG. 1D, a single demarcation device 108 can provide connectivity to a plurality of distribution points (e.g., 104A, 104B), as well to a plurality of CPE 120A, 120B, 120C. In such an embodiment, demarcation device 108 could include attachments for multiple internal transport media 124A, 124B, 124C and multiple external transport media 112A, 112B. Moreover, as illustrated by FIG. 1D, each distribution point 104A, 104B can be associated with a different control point 128A, 128B, respectively. In alternative embodiments, a single control point could provide configuration information to demarcation device 108 with respect to both distribution points 104A, 104B.

Figure 1E:
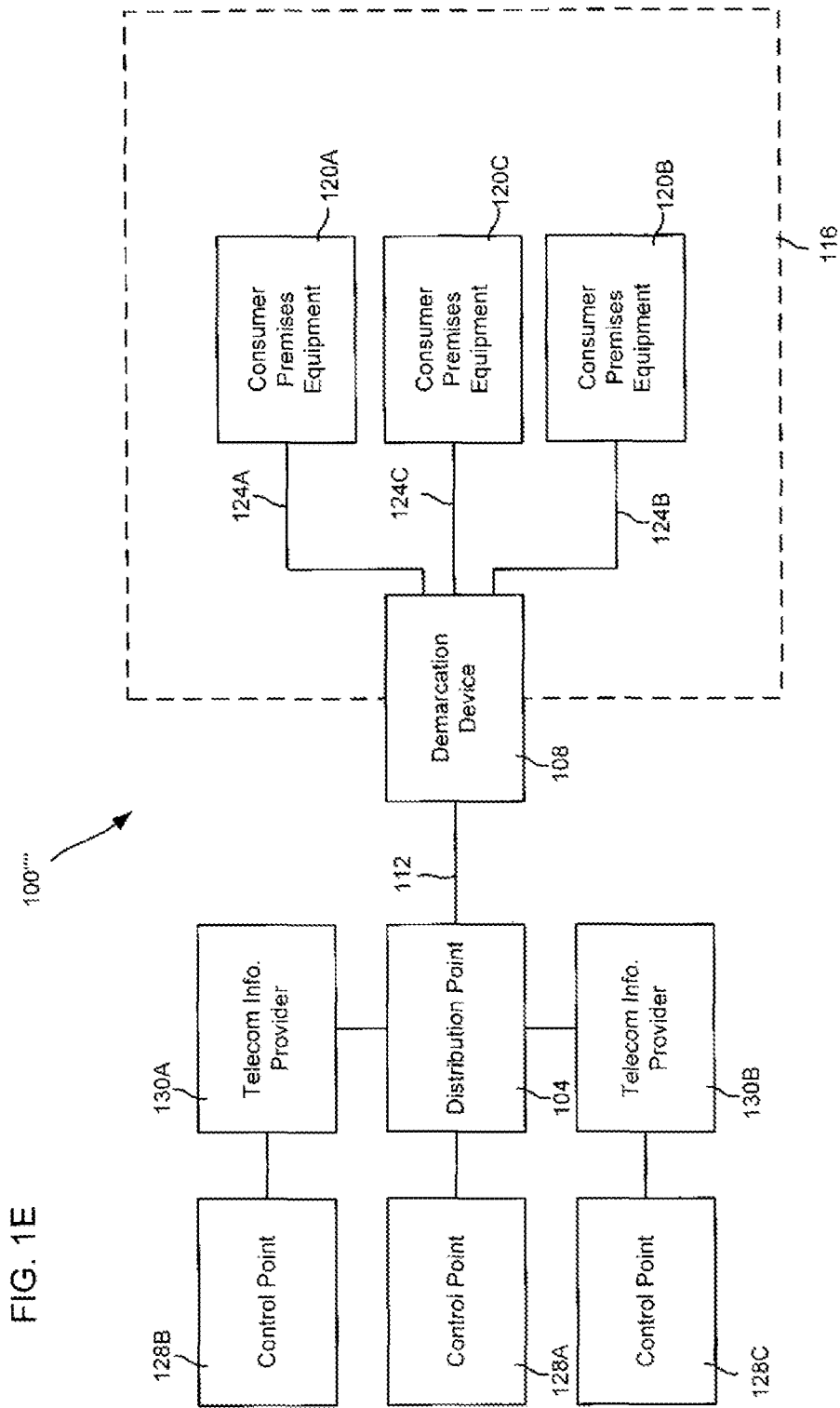

Turning now to FIG. 1E, another exemplary system 100'''' is presented in accordance with certain embodiments of the invention. In exemplary system 100'''', demarcation device 108 can be in communication with distribution point 104. In turn, distribution point 104 (perhaps operated by a telecommunication service provider) can be in communication with one or more telecommunication information providers 130A, 130B. Each telecommunication information provider 130A, 130B can be the source or recipient of one or more telecommunication information sets (each of which can be associated with a particular telecommunication service), each of which can be transmitted to (or received from) distribution point 104. Distribution point 104 can also transmit these information sets to (or received them from) demarcation device 108, via external transport medium 112. As discussed below, demarcation device 108 can be capable of processing a plurality of such information sets in a variety of ways.

In certain embodiments, each telecommunication information provider 130A, 130B can have an individual control point 128B, 128C. In some such embodiments, control points 128B, 128C can be in communication with demarcation device 108 via distribution point 104, or, alternatively, could have a separate means of communication with demarcation device 108 (e.g., via a modem and telephone line). Thus, in some embodiments, demarcation device 108 can receive configuration information from each control point 128B, 128C. As discussed above, configuration information can direct the behavior of demarcation device 108, in particular with respect to how to handle telecommunication information received from, or sent to, the associated telecommunication information provider.

In some embodiments, demarcation device 108 can be configured to accept configuration information related only to the telecommunication information and/or services provided by the telecommunication information provider sending the configuration information. In this way, demarcation device can be protected against inadvertent (or malicious) misconfiguration, which could interrupt a telecommunication service provided by another telecommunication information provider. Likewise, demarcation device 108 could be configured to automatically request updated configuration information from control point 108A associated with distribution point 104 in the case of misconfiguration, and control point 108A could maintain a master set of configuration information to be able to accommodate such a request.

In other embodiments, telecommunication information providers 130A, 130B may not have an associated control point. In such embodiments, telecommunication information providers 130A, 130B can send configuration information to control point 128A (perhaps via distribution point 104A), and control point 128A can relay that configuration information to demarcation device 108 (again, perhaps through distribution point 104). In this way the telecommunication service provider can control which configuration information is transmitted to demarcation device 108.

In certain embodiments, demarcation device 108 can submit a request for configuration information to one or more control points 128A, 128B, 128C, perhaps via distribution point 104. Such a request might be made, if, for instance, the customer would like to watch a pay per view movie. The appropriate control point (e.g., 128B) could then provide the proper configuration information to demarcation device as described above, and the configuration information could enable demarcation device to transmit the movie to customer premises 116.

As exemplified by system 132 on FIG. 1F, embodiments of the invention enable a single demarcation device 108 to serve multiple CPE 134A-F, each of which can be a different appliance, at a single customer premises 136. For instance, CPE 134A can be a computer with an Ethernet interface, CPE 134B can be a telephone, CPE 134C can be a video game system, CPE 134D can be a set-top box attached to a television, CPE 134E can be a computer with an HPNA interface, and CPE 134F can be a laptop computer equipped with a wireless network card.

Also as illustrated by system 132, demarcation device 108 can support multiple network topologies. For instance, demarcation device 132 can serve as a hub for a point-to-point network topology, with multiple point-to-point connections to CPE 134A, 134B via internal transport media 138A, 138B, respectively. In addition, demarcation device 132 can support a bus topology, as illustrated by internal transport medium 140, which can connect demarcation device 132 to CPE 134C, 134D, 134E. Demarcation device 108 can also be equipped with a wireless transmitter 142 for communication with wireless-capable CPE 134F. In this way, demarcation device 108 can support a wide variety of networking media in customer premises 136, including the existing telephone, satellite, cable, and network wiring. For instance, the existing telephone wiring in most homes is arranged in a bus topology, as is most coaxial cable (for instance RG6 or RG59) installed by cable television providers, although each may, in some implementations, be wired using a star topology. In contrast, many homes also have 10Base-T Ethernet networks, which sometimes require a central hub. As used herein, the term "10Base-T" can be understood to include newer implementations of Ethernet over unshielded twisted pair wiring, including, for instance, 100 megabit Ethernet (100Base-T, 100VG-AnyLAN, etc.) and gigabit Ethernet (1000Base-T) standards. Demarcation device 108 can support these and other network topologies, serving as the hub in a 10Base-T network if necessary.

Figure 1G:
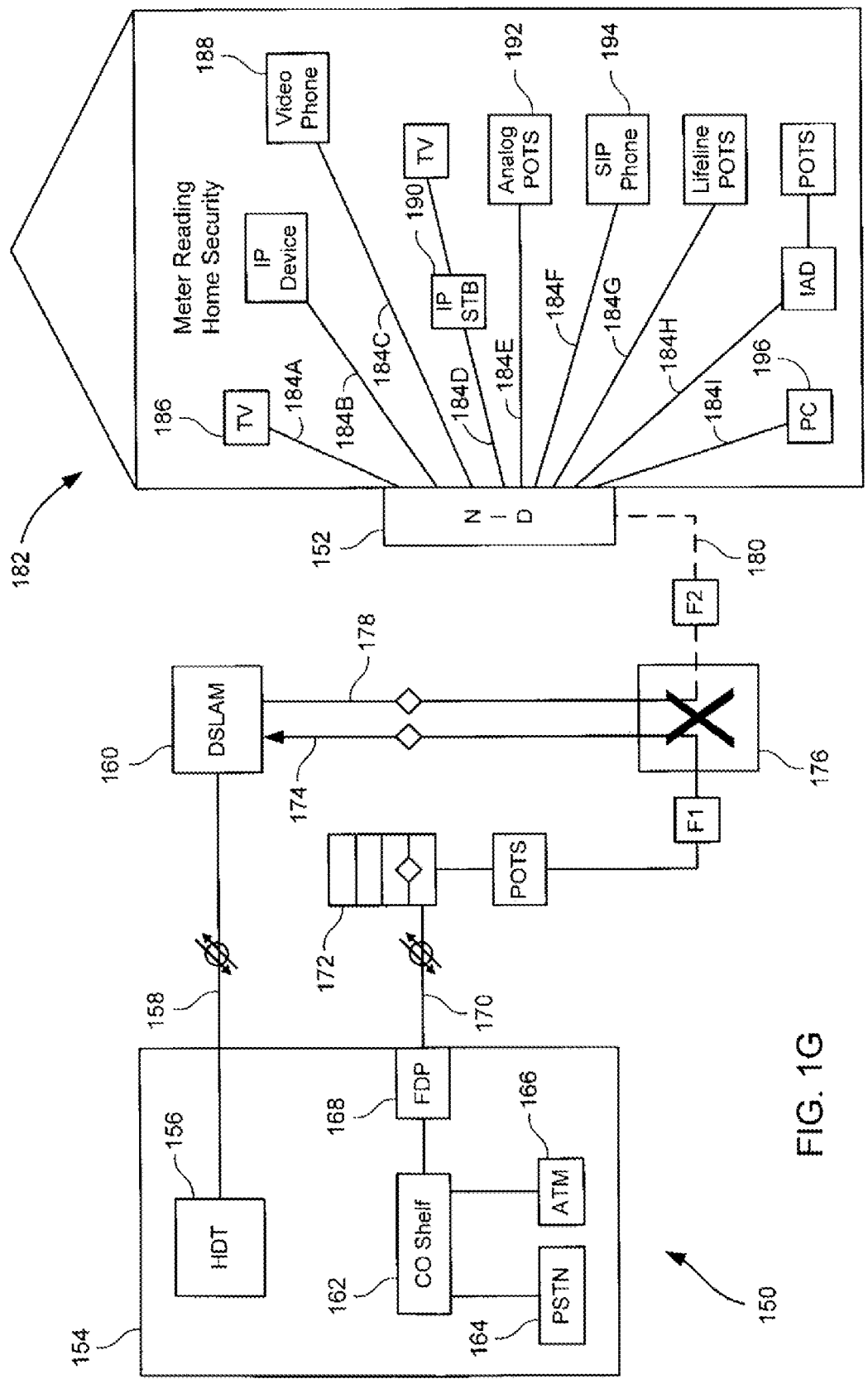

FIG. 1G illustrates another exemplary system 150 for using a demarcation device 152 in an xDSL implementation, according to certain embodiments of the invention. In some embodiments, distribution point 154 can comprise a host digital terminal 156 coupled by transport medium 158 to DSLAM 160. (As noted above, however, in other embodiments, DSLAM 160 or other equipment can be considered the distribution point.) Host digital terminal 156 can be coupled to any of a variety of data sources and/or recipients, either directly, or indirectly (e.g., through the provider's network and/or the Internet). In the illustrated embodiment, transport medium can be a Synchronous Optical NETwork ("SONET") link (e.g., OC-3, OC-12, etc.), although those skilled in the art will recognize that other suitable transport media may be substituted.

In accordance with some embodiments, distribution point 154 also comprises a central office shelf 162 in communication with the PSTN, as well with an asynchronous transfer mode ("ATM") network 166, either of which can provide connectivity to any of the variety of data sources and/or recipients discussed above. In certain embodiments, shelf 162 is, in turn, coupled to fiber distribution panel 168, which is connected by transport medium 170 to a digital loop carrier remote termination cabinet 172. Remote termination cabinet 172 can also be coupled to DSLAM 160 by transport medium 174, which may be routed through serving area interface 176. In effect, transport medium 174 can carry one or more POTS information sets, and transport medium 158 can carry one or more non-POTS (in this case xDSL) information sets.

As illustrated, these two information sets can be combined at DSLAM 160, which is in communication with serving area interface 176 through transport medium 178. Serving area interface 176 can coupled to demarcation device 152 by transport medium 180, and in the illustrated embodiment, demarcation device 152 is fixedly attached to an exterior wall at customer premises 182. Demarcation device can then be coupled via one or more internal transport media 184A-I to a variety of CPE, including without limitation a television set 186, a video phone 188, an IP-compatible set-top box 190, an analog (POTS) telephone 192, an IP-compatible phone 194, and a personal computer 196. In this way, a demarcation device can be used to provide a plurality of telecommunication services to a customer premises.

As alluded to above, a NID is one type of demarcation device that can serve as the interface between an external transport medium and an internal transport medium. Generally, a NID can incorporate all of the functionality of the demarcation devices discussed above. In addition, in accordance with some embodiments, a network interface device also can offer enhanced functionality in the provision of telecommunication services, as described below.

Figure 2B:
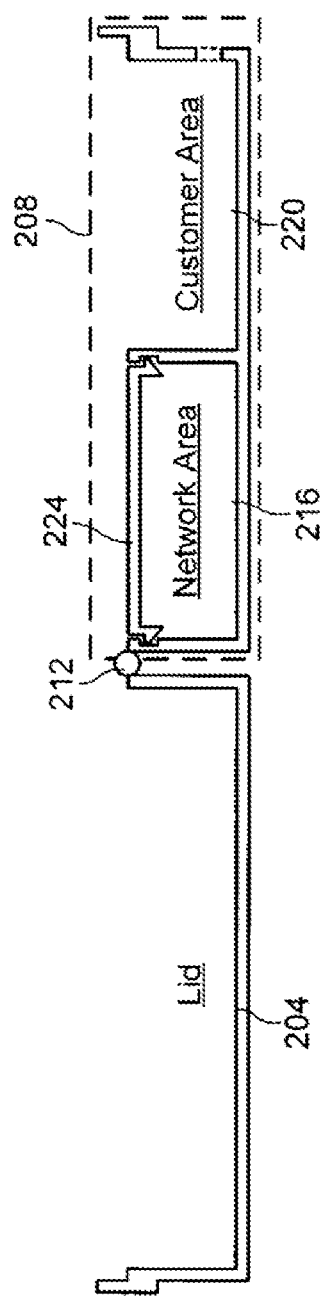
FIG. 2B is a cross sectional drawing further illustrating the network interface device of FIG. 2A.

Turning now to FIG. 2A, one exemplary embodiment of a NID 200 is illustrated. In the illustrated embodiment, NID 200 comprises a clamshell design, with a lid portion 204 and a body portion 208 connected by hinges 212A, 212B. Turning now to FIG. 2B, it can be seen that body portion comprises a network area 216 and a customer area 220. Generally, network area 216 is adapted to receive a cover and is designed generally to be accessible only to personnel authorized by the telecommunication service provider. In contrast, when NID 200 is open, the customer can access customer area 220 to add or remove components as desired. In this and other ways, NID serves to isolate the telecommunication service provider's network from the customer's network, as described above. As discussed below, lid portion, 204 can contain a processing system (not shown in FIG. 2B)

Returning to FIG. 2A, NID 200 can include a first interface 228 for communicating with the provider's external transport medium. Those skilled in the art will recognize that, in some embodiments, as described above, the external transport medium can be the twisted-pair copper "local loop" running from the customer's premises to the telecommunication service provider's local office, and interface 228 can allow for the attachment of the local loop to NID 200. As discussed above, in other embodiments, the external transport medium can be any of a variety of other media, including satellite transmissions, wireless transmissions, coaxial cable. In fact, in certain embodiments, the external transport medium can comprise multiple transport media (of the same or different types), for which NID 200 could include multiple interfaces. In some such embodiments, NID 200 can function to logically couple or bond a plurality of external transport media to one another, seamlessly increasing the bandwidth available to the customer premises. For instance, a customer premises might have a satellite link to one telecommunication service provider and an ADSL link to another provider, and NID 200 could combine or multiplex these two links to provide an apparent single, higher-bandwidth to the customer premises. Similarly, those skilled in the art will recognize that, in certain of these embodiments, a particular external transport medium (for instance, a satellite link) may be more well-suited to one way transmission of telecommunication information; in such cases, NID 200 could use a second external transport medium (for instance, an ADSL link) to allow transmission in the other direction.

Interface 228 can be coupled to a discrimination device 232, which can be operative to separate information sets received on interface 228 (and, conversely, aggregate information sets for transmission on interface 228). Merely by way of example, in particular embodiments, discrimination device 232 can separate POTS information from other telecommunication information and/or isolate signals on the internal transport medium from the external transport medium (and vice-versa). In some embodiments, for instance xDSL implementations, discrimination device 232 can comprise one or more filters. Such filters can include (but are not limited to) high-pass, low-pass and/or band pass filters. For instance, in an xDSL implementation, discrimination device 232 might include a high-pass and/or low-pass filter for separating high-frequency (e.g., data) from low frequency (e.g., POTS) information. In other embodiments, discrimination device 232 can comprise many other types of filters, including both digital and analog filters. Demarcation device 232 can be operable to separate information sets through a variety of criteria, including for example, by frequency, by destination device, information type, frequency. Further, in certain embodiments, information sets can be multiplexed (for instance, using various time-division multiplexing or wave-division multiplexing schemes known in the art) for transmission over an external transport medium, and discrimination device 232 can comprise a de-multiplexer capable of separating multiplexed signals and, optionally, routing each signal to the appropriate destination.

In the illustrated embodiment, discrimination device 232 is in communication with a second interface 236, which can interface with the telephone wires at the customer premises to provide traditional analog telephone service. In some embodiments, an aggregator 240 can be situated between discrimination device 232 and interface 236 to allow additional (perhaps non-POTS) information sets to be sent and received through interface 236 simultaneously with the POTS information. This can include, for example, aggregating information sets for transmission of an HPNA (or HPNA+) signal over an internal transport medium.

The discrimination device can also be coupled to a processing system 244, which in the illustrated embodiment is located in the lid portion 204, and all non-POTS information sets can be routed to processing system 244 for additional processing. Processing system 244 is described in detail below, but can, in general, comprise one or microprocessors, including digital signal processor ("DSP") chips, and/or memory devices, including both volatile and non-volatile memories, as well as a variety of read-only memory devices known in the art, such as programmable read only memory ("PROM") devices and erasable programmable read only memory ("EPROM") devices (a term which should be interpreted to include electrically erasable programmable ("EEPROM") devices, in addition to other EPROM devices) and storage devices (including hard disk drives, optical drives and other media) In fact, processing system 244 can comprise the equivalent of one or more personal computers, running any of a variety of operating systems, including variants of Microsoft's Windows™ operating system, as well as various flavors of the UNIX™ operating system, including open source implementations such as the several Linux™ and OpenBSD™ operating systems.

Telecommunication information (or information sets) can be processed by processing system 244 in a variety of ways, including, for example, routing a given information set to a particular interface, transforming information (for example, encoding/decoding information and converting between different transport protocols), storing information, filtering information, and any of the other functions described herein with respect to processing systems. In certain embodiments, processing system 244 can serve as the termination point for an external transport medium; for instance processing system 244 can incorporate the functionality of an xDSL modem. In other embodiments, processing system 244 can serve to identify quality of service requirements (for instance, latency requirements for voice transmissions and bandwidth requirements for streaming media transmissions, to name a few) and enforce those requirements, ensuring that sufficient bandwidth is provided to a particular device, network segment or application to maintain the quality of service required.

In certain embodiments, for instance, as described above with respect to FIG. 1D, a NID may comprise another interface in communication with a second distribution point 104B, perhaps operated by a different telecommunication service provider, through an additional external transport medium 112A. In such a case, the additional external interface could be coupled to discrimination device 232, or it could be coupled to another discrimination device, which could also be in communication with processing system 244, interface 236 and/or aggregator 240. Thus, certain embodiments allow a single NID to serve as a communication gateway between the customer premises and multiple telecommunication service providers, including combining or multiplexing multiple external transport media (each of which may be in communication with a different telecommunication service provider and/or telecommunication information provider) as discussed above.

Returning to FIG. 2A, processing system 244 can be in communication with aggregator 240, which, as discussed above, can aggregate non-POTS information sets received from processing system 244 and POTS information sets received directly from discrimination device 232 for consolidated transmission via interface 236, among other functions. In effect, discrimination device 232 and aggregator 240 (perhaps in conjunction with processing system 244) can function to separate telecommunication information received on interface 228 into a set of POTS telecommunication information and a set of non-POTS telecommunication (wherein POTS information can be understood to be ordinary telephone signals, and non-POTS information can be understood to include all other telecommunication information), route the non-POTS information via transport medium 248 to processing system 244 for processing, and route the POTS information to interface 236 for transmission to the internal transport medium. In certain embodiments, one or more sets of non-POTS information can be routed to interface 236 using transport medium 252 for transmission through interface 236, perhaps in combination with one or more sets of POTS information.

Of course, discrimination device 232 and aggregator 240 can perform the same function in reverse (i.e., to separate and recombine different sets of telecommunication information received on interface 236 from the customer's premises). Thus, in some embodiments, both discrimination device 232 and aggregator 240 each can perform a combined discrimination device-aggregator function, depending on the direction of information flow. In fact, while termed "discrimination device" and "aggregator" for ease of description, those two devices can actually be identical, and further, their functionality can, in some embodiments, be incorporated into a single device, which could be coupled to interface 228, interface 236, and processing system 244 and could route information sets among any of those components as necessary. Moreover, as described below, the functionality of discrimination device 232 and/or aggregator 240 can be incorporated into processing system 244; likewise, discrimination device 232 can incorporate interface 228 and/or aggregator 240 can incorporate interface 236, such that discrimination device/and or aggregator comprise the necessary components to be coupled directly to the external and internal transport media, respectively.

Discrimination device 232 and/or aggregator can also serve another function in certain embodiments: Since the external transport medium is coupled to first interface 228 and the internal transport medium can be coupled to, inter alia, second interface 236, the discrimination device and/or aggregator can serve as an isolation device for intermediating between the two media, such that when a topological change occurs in one of the media, only the NID interface need be changed, and the other transport medium is not affected. In some such embodiments, discrimination device 232 and/or aggregator 240 can serve to intermediate (including protocol translation and the like) between interfaces 232, 240, allowing either the internal or the external transport medium to be upgraded or changed without impacting the other transport medium. Of course, in certain embodiments, this isolation function also could be performed by processing system. In yet other embodiments, the isolation device might comprise a separate piece of hardware in communication with discrimination device 232, aggregator 240 and/or processing system 244.

In certain embodiments, NID 200 can have one or more additional interfaces 256, 260 in communication with processing system 244 via transport media 264, 268, respectively. Additional interfaces 256, 260 can be adapted to communicate with any of a variety of internal transport media to send/receive telecommunication information to/from the customer premises. For instance, interface 256 can be a coaxial interface for connection to RG6 and/or RG59 cable, and interface 260 can be an RJ45 and/or RJ11 interface for connection to unshielded twisted pair cable (which can, for instance, form a 10Base-T Ethernet network).

In certain embodiments, NID 200 can comprise a line driver (not shown on FIG. 2A), coupled to processing system 244 and aggregator 240. The line driver can function to allow conversion between various network formats and media, allowing a variety of different media types (e.g., twisted pair and/or coaxial cable, in accordance with the HPNA and HPNA+ standards, as well, perhaps, as the customer premises' A/C wiring, in accordance, for example, with the HomePlug™ standard) to transport combined POTS and non-POTS information sets. If necessary, one or more different line drivers can be used to accommodate a variety of transport media.

The ability of NID 200 to support multiple interfaces of different types allows great flexibility in routing telecommunication information throughout the customer premises. Merely by way of example, if interface 228 receives telecommunication information that includes digitally-encoded video signals (e.g., MPEG-2 data), the information set that includes the encoded video signals can be routed by discrimination device 232 to processing system 244, which can decode the signals into an RF-modulated NTSC, HDTV and/or PAL format and transmit the signals via transport medium 264 to coaxial interface 256, where it can be transmitted via coaxial cable to one or more televisions at the customer premises. Alternatively, if the customer has a digital set-top box located at the television, the encoded signals can be routed by processing system 244 (perhaps through the appropriate line driver) to aggregator 240, where the signals can be transferred through interface 236 to the set-top box for decoding.

Similarly, in some embodiments, NID 200 might receive IP data (perhaps combined with other types of telecommunication information) on interface 228. The information set comprising the IP data can be routed by discrimination device 232 via medium 248 to processing system 244, where it can be processed, and depending on the embodiment, routed via transport medium 252 to the customer's existing telephone wiring (perhaps using interface 236, optionally in conjunction with aggregator 240 and/or one or more line drivers), routed to a 10Base-T network (perhaps transport medium 268 and interface 260), routed to a coaxial cable (e.g., using transport medium 264 and interface 256), or routed via a wireless interface (not shown in FIG. 2A).

Alternatively, the IP data can be routed to any combination of these interfaces, and any of these interfaces could also receive IP or other telecommunication information from a CPE at the customer premises, for routing to processing system 244. In this way, NID 200 can allow virtually unlimited connectivity options for each CPE at the customer premises. Adding to the flexibility of NID 200, processing system 244 can include the necessary components to serve, for instance, as a cable, wireless, or xDSL modem, as well as components necessary to serve as an Ethernet hub, switch, router or gateway, the functions of each of which are familiar to those skilled in the art.

In certain embodiments, NID 200 can comprise a power supply 272 for providing electrical power to the components in NID 200. Power supply 272 can be powered through electrical current carried on the external transport medium and received on interface 228. Alternatively, power supply can receive electrical current from a coaxial interface (e.g., 256), or through a dedicated transformer plugged into an A/C outlet at customer premises, e.g., through 12V connection 276. Processing system 244 can be powered by a connection 280 to power supply 272, or through one or more separate power sources, including perhaps the A/C power of the customer premises. In some embodiments, processing system 244 might have its own power supply.

Figure 3:
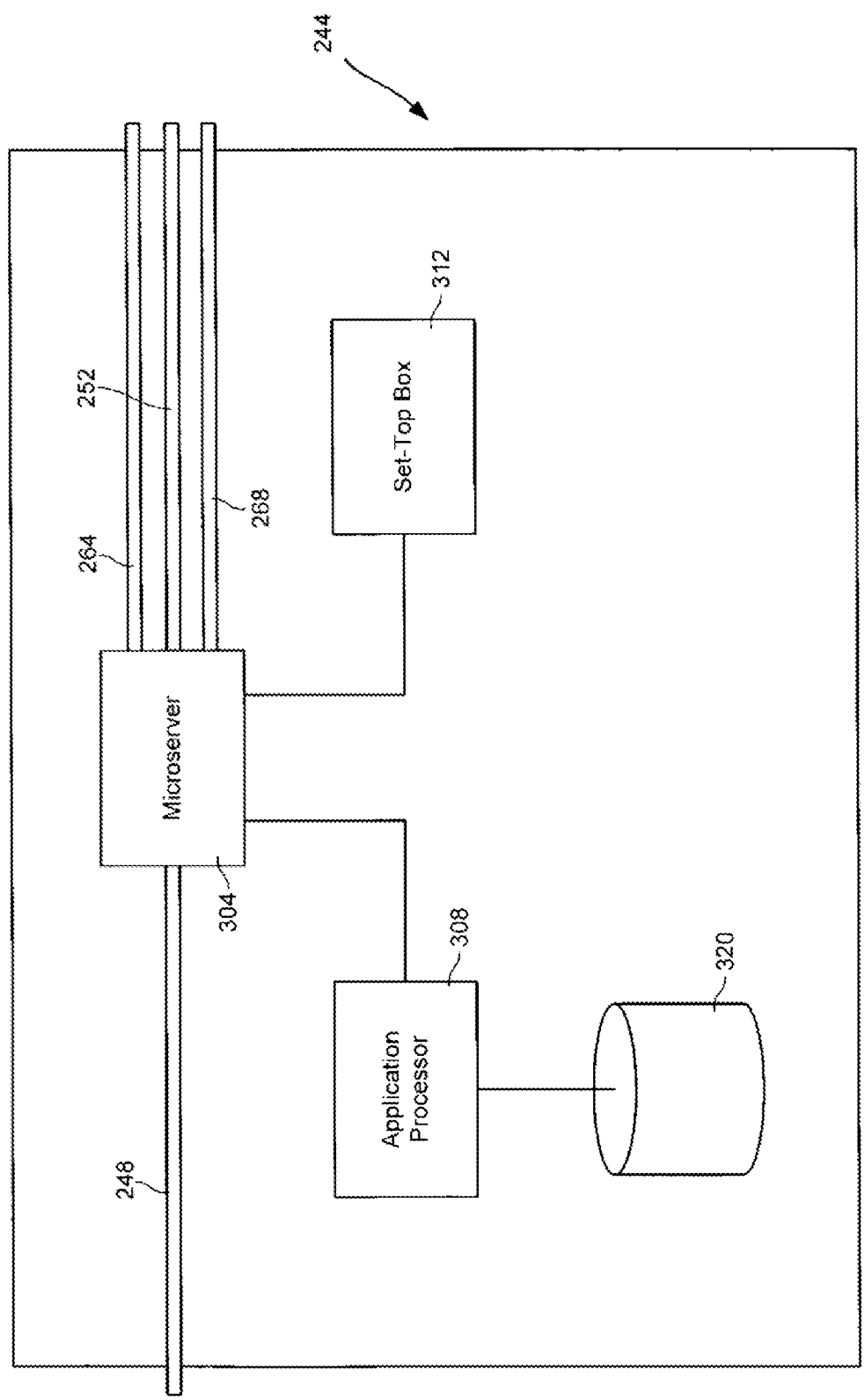
FIG. 3 is a schematic drawing illustrating a processing system that can be included in a network interface device.

As mentioned above, processing system 244 can comprise a plurality of processing devices, and each processing device can comprise multiple components, including microprocessors, memory devices, storage devices and the like. Merely by way of example, FIG. 3 provides a detailed illustration of exemplary processing system 244, which comprises multiple processing devices 304, 308, 312. In accordance with the exemplified embodiment, transport medium 248 links processing system 244 with an external transport medium (perhaps via a discrimination device and/or interface, as described above).

Transport medium 248 can be coupled to microserver 304, such that any information received by processing system 244 via transport medium 248 is first processed by microserver 304. Microserver can, in some embodiments, be the equivalent of a server computer, complete with memory devices, storage devices, and the like, each of which is known in the art and none of which is illustrated on FIG. 3. In certain embodiments, microserver 304 serves as the controller for the NID, overseeing the NID's configuration and monitoring performance; in some such embodiments, the controller functions can be accessed using a web browser. Depending on the embodiment, microserver 304 can be capable of performing a wide variety of additional functions, including functions related to administering any local area network comprised by the internal transport medium. For instance, microserver 304 can function as an xDSL modem in certain embodiments, allowing a home network attached to the NID to transmit and receive data via an xDSL connection to a telecommunication service provider. Microserver 304 can, in some cases, also function as a hub, bridge, switch or router.

Further examples of functions of microserver 304 in various embodiments include a dynamic host configuration protocol ("DHCP") server, which, as those skilled in the art will appreciate, allows for flexible configuration of an IP network using any internal transport medium attached to the NID, and a network address translation ("NAT") server, which provides some security against unauthorized use of the customer's network. Microserver 304 can also function as a HyperText Transport Protocol ("HTTP") server, which, among other benefits, can allow configuration of the NID through a convenient web interface, as well as a bridge, switch or router, which can be capable of supporting advanced routing techniques, such as MPLS and EFM, to name a few. Microserver 304 can function further to manage quality of service requirements, as described above.

In addition to these functions, microserver 304 can be configured to route information sets received via transport medium 248, according to the type of telecommunication information in the set (e.g., encoded video, IP data, etc.) as well as any addressing information associated with either the set or the information it comprises (e.g., a specified destination port or network address for a particular subset of telecommunication information). In this way, microserver 304 can serve a switching function somewhat similar to that described with respect to discrimination device 232 described in relation to FIG. 2A. For instance, if IP data is received by microserver 304, such data can be routed to an Ethernet connection, to the existing telephone wiring (e.g., in an HPNA implementation), or to any other appropriate medium (perhaps via an appropriate line driver). In fact, in certain embodiments, processing system 244 (and in particular microserver 304) can incorporate the functionality of discrimination device 232 and/or aggregator 240, rendering those components optional.

In addition to microserver 304, processing system 244 can include other components, including, for instance, application server 308 and set-top box 312, which, in the illustrated embodiment, are coupled to microserver 304. Application server 308 can comprise the equivalent of a computer, as described above, and thus can comprise one or more storage devices, such as hard disk drive 320, as well as memory devices, microprocessors and the like, to enable it to store and process telecommunication information and other data. In certain embodiments, application server 308 can perform tasks with processing, memory and/or storage requirements that render microserver 304 unsuitable, including a wide variety of consumer applications. For instance, application server 308 can act as a digital recorder for storing video (perhaps as a video-on-demand server or a personal video recorder), a file and/or application server for a home network attached to the NID, a Voice over IP ("VoIP") server, caller identification server, or voice gateway for a telephone system attached to the NID. Application server 308 can also function as a home security server, allowing the control of various features and configuration options for a home security system.

Set-top box 312, which, in some embodiments, can be coupled to microserver 304 as illustrated on FIG. 3, can provide traditional set-top box functionality (e.g., decoding of television signals, frequency switching, etc.), as well as provide enhanced features, including, for example, the provision of picture-in-picture signals for non picture-in-picture televisions, the provision of video on demand, personal video recorder features, and many other such features.

Processing system 244 can have multiple means of input and output. Merely by way of example, microserver 304 can communicate with one or more external transport media (perhaps, as discussed above, via intermediary devices) using one or more transport media (e.g., 248). Processing system 244 (and, specifically, microserver 304) also can communicate with one or more internal transport media (for example category 5, 5e and/or 6 unshielded twisted pair wire 268, RG6 and/or RG59 coaxial cable 264, and category 3 unshielded twisted pair copper (telephone) wire 252), again possibly via intermediary devices, as discussed with reference to FIG. 2A. Notably, some embodiments of processing system 244 can include interfaces for multiple transport media of a particular type, for instance, if processing system (and, in particular, microserver 304) serves as a networking hub, switch or router. Processing system 244 can also have infra-red and radio-frequency receivers and/or transmitters, for instance to allow use of a remote control device, as well as wireless transceivers, for instance to allow wireless (e.g., IEEE 802.11) networking.

As illustrated on FIG. 3, in some embodiments, microserver 304 manages the connections between application server 308, set-top box 312 and transport media 248, 252, 264, 268, routing data as necessary. In other embodiments, each processor 304, 308, 312 can have independent connections to one or more transport media.

It should be recognized that the devices within processing system 244 are described for illustrative purposes only. The functionality described above with respect to microserver 304, application server 308 and set-top box 312, respectively, each could be incorporated into a single device within processing system 244. Alternatively, their functions described herein could be divided among any number of processors and devices within processing system 244. Thus, the division of functions among devices within processing system 244 is discretionary and should not be considered to limit the scope of the invention.

Figure 4:
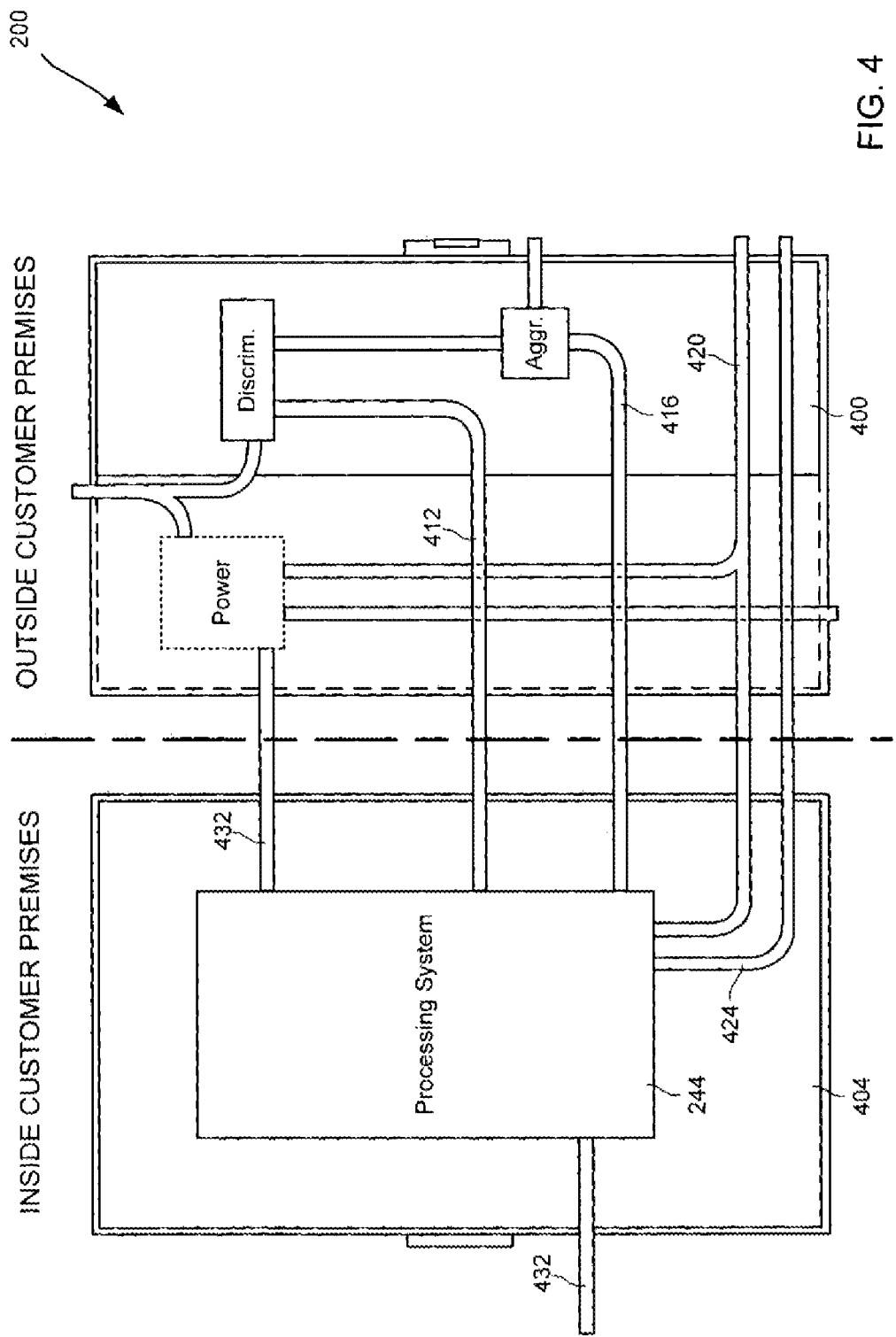
FIG. 4 illustrates a distributed network interface device.

In accordance with some embodiments, the NID might comprise multiple enclosures, each located in a different location and in communication with one another. Merely by way of example, FIG. 4 illustrates an alternative embodiment of the invention, including a NID 400 and a separate processing system 404. In the illustrated embodiment, NID 400 can include the features described above, except that processing system 404 can be located distal to NID 400. In this way, processing system 404 can be located in a more secure area (for instance, inside the customer premises), while NID 400 can be located conveniently at the exterior of the customer premises, where it can be accessed easily by service personnel. (Of course, it should be noted that a NID can also be hardened, so that it can be securely located in its entirety on the exterior of the customer premises, as, for instance, in the embodiments discussed above.) In some embodiments, processing system 404 can be in communication with NID 400 via similar transport media 412, 416, 420, 424 to those discussed with respect to FIG. 3 (248, 252, 264, 268, respectively) and can include all of the same functionality of the embodiments discussed above. As illustrated in FIG. 4, processing system 404 generally will draw power from its own source 428, although it could also be powered by NID 400, either via one of the transport media 412, 416, 420, 424 or through a separate power connection 432.

Figure 5:
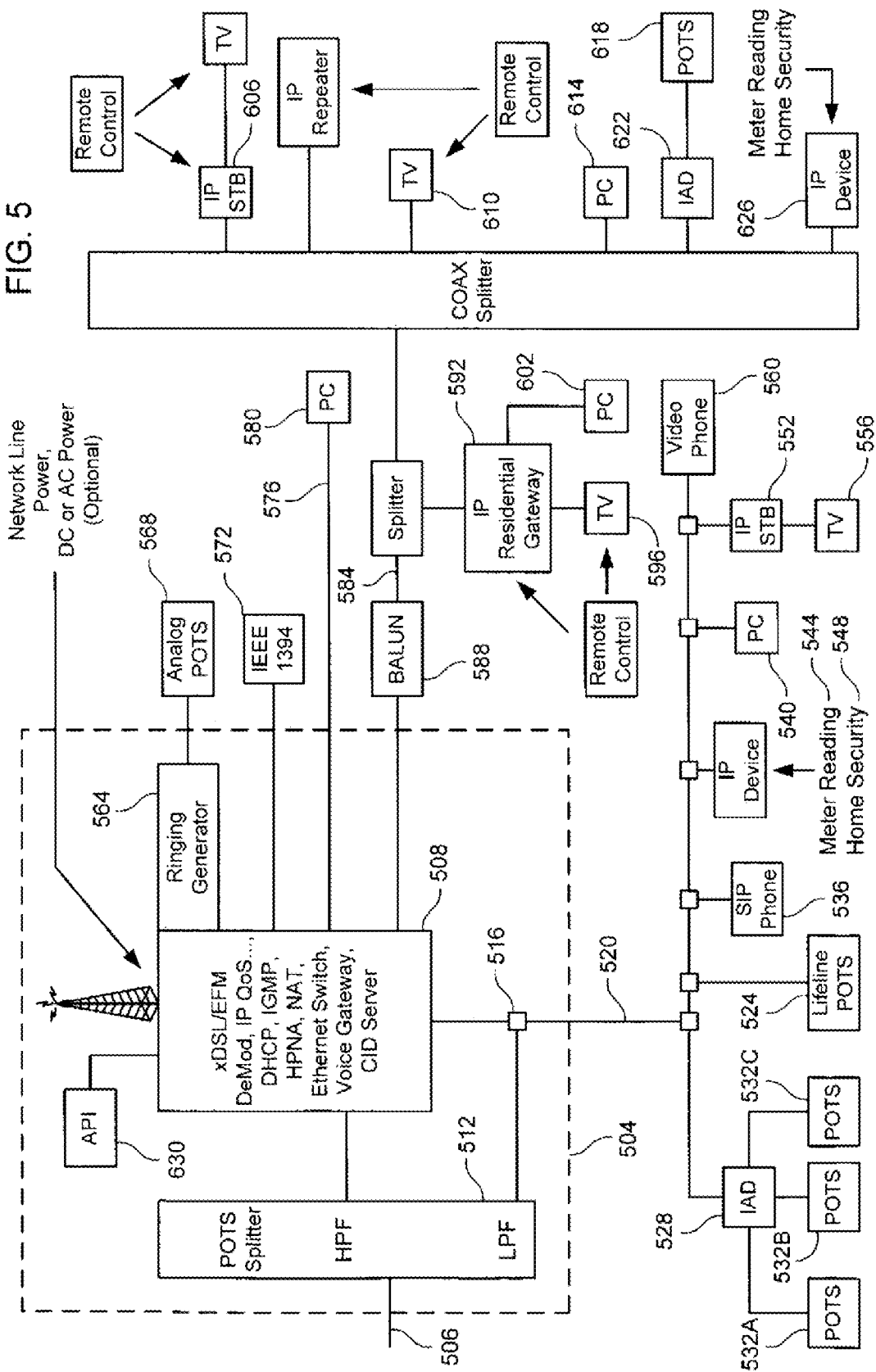
FIG. 5 illustrates a network interface device providing a variety of telecommunications services to a customer premises.

FIG. 5 illustrates an exemplary system 500 in which a NID 504 in accordance with certain embodiments of the invention is interconnected via several internal transport media to a wide variety of CPE, providing many different telecommunication services. NID 504 can be in communication with a telecommunication service provider's network via external transport medium 506, which can be any of the media described above; in this exemplary embodiment, it is a twisted pair copper "local loop," capable of carrying one or more POTS data sets and one or more xDSL information sets. NID 504 can have a processing system 508 in communication with discrimination device 512, which can be a combined high pass/low pass filter. As mentioned above, discrimination device 512 can function to separate POTS information sets from non-POTS information sets, with the former routed to aggregator 516, which can serve as an interface to a category 3 twisted pair internal transport medium 520. Processing system 508 can also be in communication with aggregator 516, so that non-POTS information sets may be transmitted using transport medium 520 as well.

Attached to internal transport medium 520 (which, in the illustrated embodiment can support the HPNA standard) can be a normal POTS telephone 524, along with an integrated access device, which, among other things, can provide POTS service via IP data transmitted via the HPNA network on internal transport medium 520. In the illustrated embodiment, three additional POTS telephones 532A, 532B, 532C are coupled to the integrated access device, although those skilled in the art will appreciate that certain embodiments will support different numbers and types of devices attached to the integrated access device. Also attached to transport medium 520 is a VoIP telephone 536, as well as a personal computer 540, which can use system 500 to access the Internet, among other things.

Further embodiments can include an IP-compatible utility meter 544, which can allow a utility provider such as a city water department or electrical utility to monitor and bill utility usage over the Internet or the telecommunication service provider's network, and/or an IP-compatible home security system 548, which can allow the customer to monitor and control home security functions remotely. Via an Internet connection to NID 504, a customer on vacation could administer home security system 548, view images from security cameras, check the status of all sensors, and even turn various lights in the house on and off.

Internal transport medium 520 can also be coupled to an IP-compatible set-top box 552, which may have a television 556 attached. In addition, certain embodiments allow for a video phone 560 to be included in system 500 and attached to medium 520. Processing system 504 can also support a digital-to-analog converter 564 (perhaps with a ring generator), to allow direct connection of a POTS phone 568 to the NID, perhaps for testing purposes or for mandated life-line service.

As mentioned above, NID 504 can support a variety of other interfaces and attachments as well. For example, in certain embodiments, NID 504 (and more precisely processing system 508) can comprise one or more fiber optic interfaces, including for example, IEEE 1394 interface 572, as well a variety of standard Ethernet connections, including for instance a category 5 10Base-T interface 576 that can be used, for example, to attach one or more personal computers (e.g., 580) to NID 504, as well as a wireless interface 578. Processing system 508 can also include a coaxial (RG6 and/or RG59) interface, either through use of a balun 588 (to convert, for example, from twisted pair to coaxial cable) or through a direct coaxial connection to processing system 508.

Like the other interfaces, coaxial interface 584 can support a wide variety of CPE and associated services, including transmission of both a video (e.g., HDTV, NTSC or PAL) information set and a data (e.g., IP data) information set, simultaneously. Supported devices can include an IP residential gateway, which can provide IP to HDTV/NTSC/PAL conversion for video display on a television 598, as well as direct IP connectivity, for example, to provide Internet access to a personal computer 602.

Through coaxial interface 584, NID 504 can also communicate with an IP-compatible set-top box, as well as directly with a cable-ready television 610, a personal computer 614 (either via a coaxial connection on the computer or through a balun), a POTS telephone 618 (for instance, through an integrated access device 622), or to any other IP-compatible device 626, such as a utility meter, home security system or the like. As discussed above, NID 504 can be programmable and/or addressable, and in some embodiments, NID 504 can include an application programming interface 630 to facilitate in the programming and/or addressing of NID 504.

Notably, different embodiments of the NID can provide several benefits, including simultaneous video, data and voice transmission, while maintaining required Quality of Service levels for each particular information set. Further, some embodiments of the NID can comprise a router that is capable of multi-protocol label switching ("MPLS"), which, those skilled in the art will recognize, allows the telecommunication service provider tremendous flexibility in designing the architecture of the external transport medium, including options, such as EFM and tag switching schemes (e.g., MPLS), that provide enhanced features and performance across the provider's network. Various embodiments of the NID also allow for a plurality of virtual private networks to be established through the NID, allowing one or more secure data connections from the customer premises to other locations.

Figure 6:
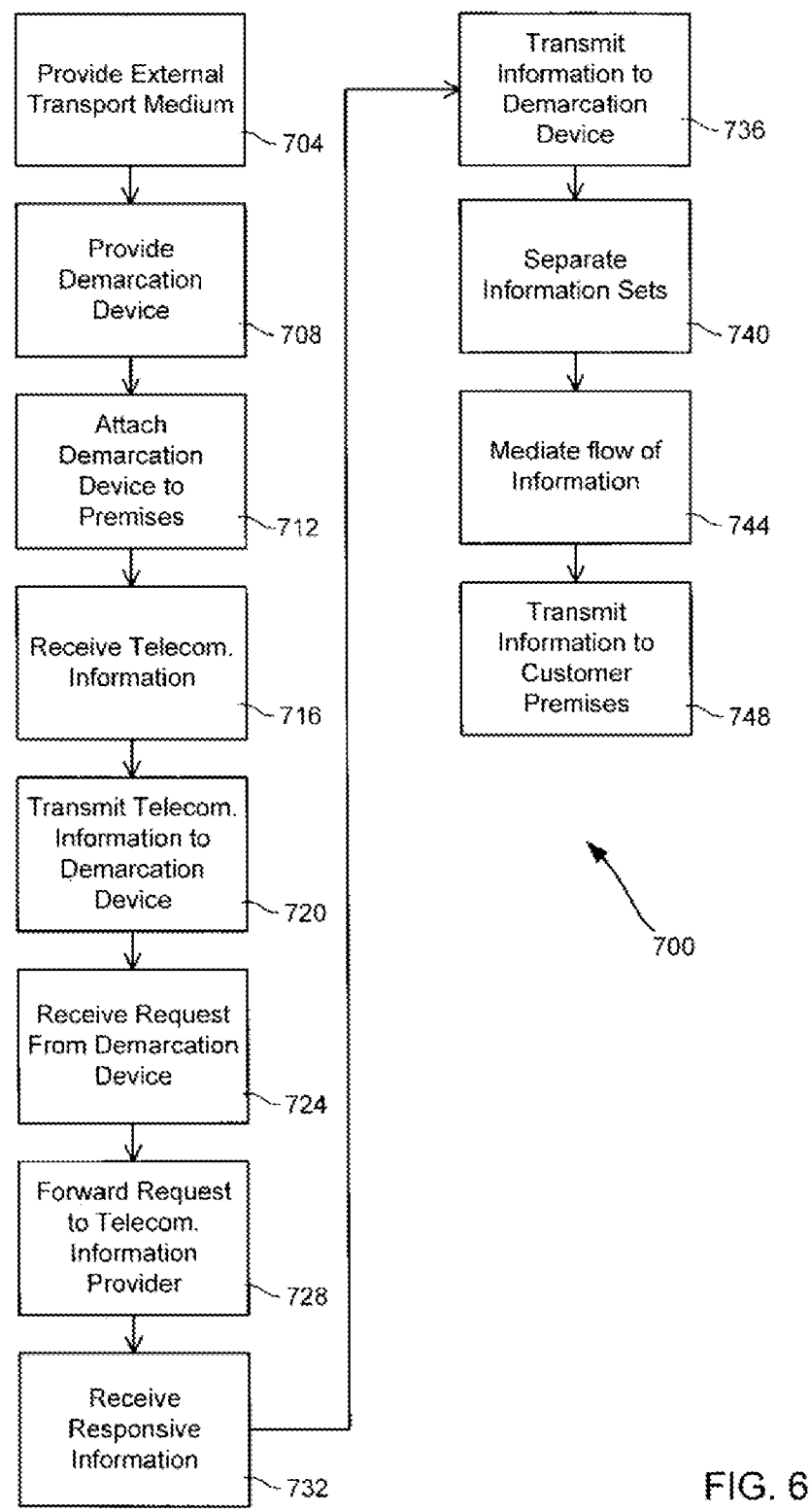
FIG. 6 illustrates a method of providing telecommunications services.

Other embodiments of the present invention provide methods for using demarcation devices, and NIDs in particular. One exemplary method 700 in accordance with certain embodiments is illustrated on FIG. 6. It should be noted that the blocks displayed on FIG. 6 are arranged for ease of description only, and their order and arrangement should not be considered to limit the scope of the invention; hence, some of functions illustrated on FIG. 6 may be performed in an order different than that illustrated, or they may be omitted entirely.

In block 704, an external transport medium is provided. A wide variety of external transport media, including any of those discussed above, may be used without varying from the scope of this embodiment. At block 708, a demarcation device is provided. In a particular embodiment, the demarcation device can be a NID, as described above. In some embodiments, the demarcation device can be attached to an external wall of the customer premises (block 712), while in other embodiments, the demarcation device can be located elsewhere, including various locations at the customer premises (such as proximate to a particular CPE or coupled to an internal transport medium in an attic, garage, basement, crawl space or the like. In still other embodiments, the demarcation device could be co-located with a portion of the external transport medium, for instance in a digital loop carrier remote termination closet, at a DSLAM, or even at the distribution point.

In certain embodiments, a distribution point can receive telecommunication information from a telecommunication information provider or other source of telecommunication information (block 716). As discussed above, the telecommunication information can comprise a plurality of sets of telecommunication information, and each telecommunication information set can be associated with a particular telecommunication service. In many embodiments, the distribution point can receive the plurality of telecommunication information sets from a plurality of telecommunication information providers.

At block 720, the telecommunication information can be transmitted to the demarcation device through the external transport medium. Generally, the telecommunication information can be transmitted from the distribution point, although, as discussed above, the distribution point need be neither the ultimate source nor the ultimate destination of the telecommunication information. At block 724, the distribution point (or other facility) can receive a request, either for configuration information as discussed above, or for a particular telecommunication information set, and, in certain embodiments, the distribution point can forward that request to the appropriate telecommunication information provider (block 728). At block 732, the distribution point can receive information (e.g., telecommunication information, perhaps including configuration information) from the telecommunication information provider that is responsive to the request, and at block 736, that responsive information can be transmitted to the demarcation device, whether generated by the distribution point (and/or an associated control point) or the telecommunication information provider.

At block 740, the demarcation device optionally can separate any telecommunication information received from the distribution point (whether or not sent in response to a request from the demarcation device) into discrete information sets, according to, inter alia, any of the criteria discussed above. Once the information sets have been separated, the demarcation device can take the appropriate action for each. Such actions can include processing the information set (perhaps with a processing system similar to that described above), transmitting the information set to a particular internal transport medium (see block 748 below), consolidating the information with one or more other information sets for combined transmission onto an internal transport medium, storing the information set (perhaps to a storage device, as discussed above), and discarding the information set, among other things.

At block 744, the demarcation device optionally can mediate the flow of telecommunication information between the internal transport medium and the external transport medium. This can be done in a variety of ways, including filtering the signals and/or frequencies sent from one transport medium to the other so as to diminish interference on one network by extraneous information, signals, and/or frequencies transmitted (intentionally or inadvertently) by the other. Mediating the flow of information can also include filtering the information sent through the demarcation device, such that particular telecommunication information (and/or information sets) can be treated differently from other information (and/or information sets). For instance, as discussed above, a given information set can be processed, routed or stored differently than other sets.

At block 728, the telecommunication information (or a subset thereof) can be transmitted to the customer premises by the demarcation device. Those skilled in the art will appreciate that, that while for ease of description, method 700 has been described with respect to unidirectional information flow (from a distribution point to a customer premises), certain embodiments of the invention easily can accommodate information flow in the opposite direction, as well as bi-directional information flow. Thus, information also could be transmitted from a CPE, through the internal transport medium, to the demarcation device. The demarcation device then could separate that telecommunication information into information sets, if necessary, and take any of a variety of actions (including those discussed above) with respect to each information set, including transmitting the information in the information set to the distribution point via the external medium.

Figure 7:
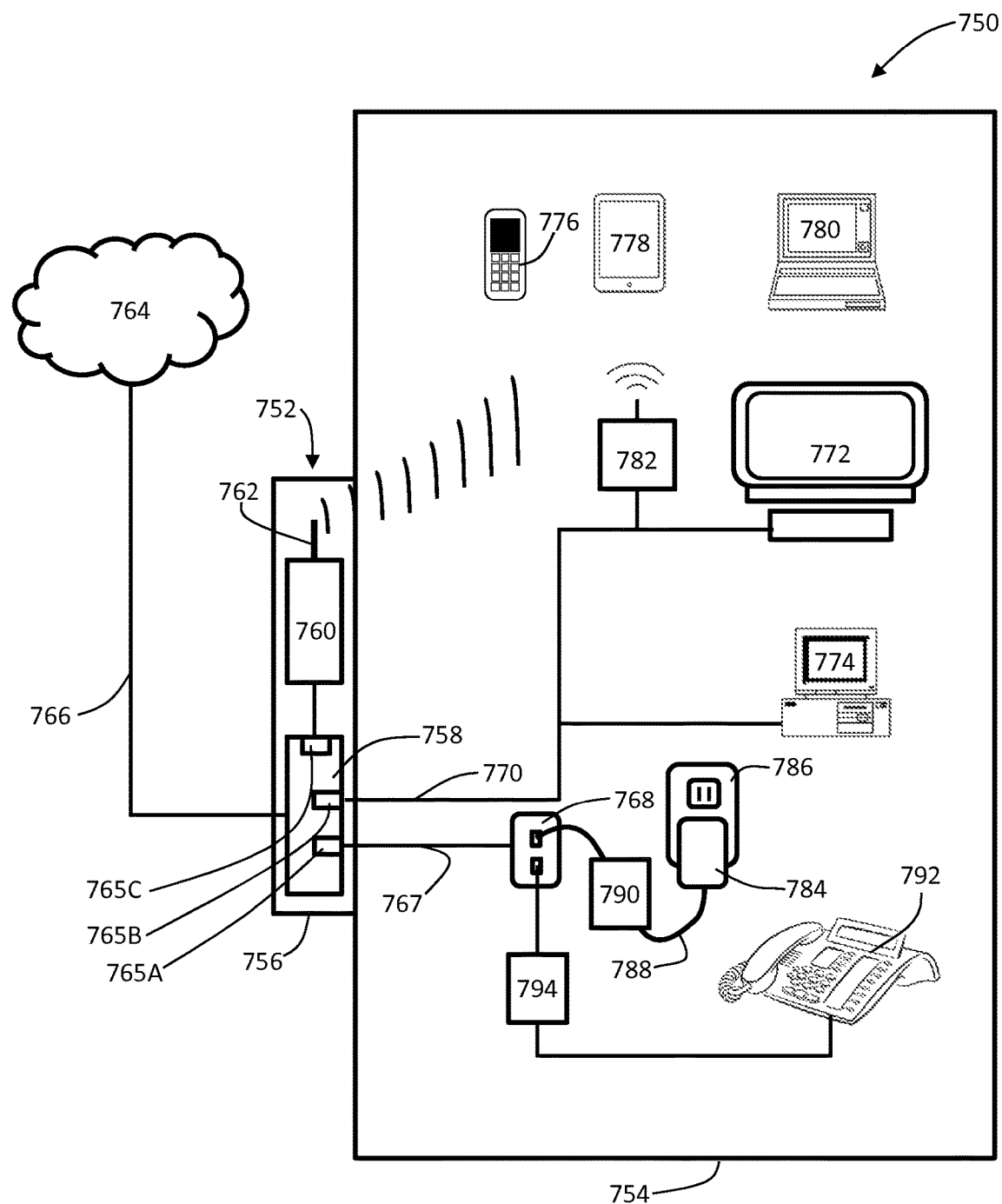
FIG. 7 is a schematic illustration of an optical network termination system featuring a back powered wireless access point, as disclosed herein.

Another set of embodiments disclosed herein include an optical network termination system, network interface device having an ONT and associated optical network termination methods. The disclosed apparatus and methods feature a wireless access point in communication with an ONT which is powered at a customer location with minimal cost, minimal installation or servicing intrusion and minimal additional cabling. One representative system 750 is illustrated in FIG. 7. The FIG. 7 system includes a network interface device 752 attached, mounted or otherwise located at customer premises 754. The customer premises 754 may be a building, home, business, school, hospital, cluster of buildings or offices or other structure or collection structures operated by a customer to which telecommunications services are provided.

The network interface device 752 may, in certain embodiments, be attached to an exterior wall at the customer premises to permit a telecommunications service provider to access the network interface device 752 without entry into the customer premises. In alternative embodiments the network interface device may be mounted within the customer premises with or without providing access to the network interface device 752 from the outside environment. The network interface device may include a housing 756 or other enclosure as described above. The network interface device further houses an ONT comprising a processor 758 and a wireless access point 760 having at least a local antenna 762. Alternatively the wireless access point 760 may communicate through a distributed antenna as described in detail below and illustrated in FIG. 8.

The ONT processor 758 is in communication with an external telecommunications network 764 through an optical fiber 766. The external telecommunications network 764 may be of any type maintained by a service provider for any communications purposes. For example, the external telecommunications network 764 may communicate any combination of telephone, data, television/video or other type of telecommunications information.

In the illustrated embodiments, the external telecommunications network 764 communicates with the ONT processor 758 over at least one optical fiber 766. As used herein, the terms "communicates with" describe the transmission or receipt of telecommunications data of any type between the elements in communication with each other. For example, telecommunications data may be transmitted from the external telecommunications network 764 to the processor 758 or telecommunications data may be communicated from the processor to the network over the optical fiber 766. The telecommunications data may be of any type including but not limited to voice signals, video signals, data or other information of any type which may be transmitted over an optical fiber.

The processor 758 includes modules necessary to receive and transmit optical signals and electrical signals. Therefore the processor includes modules to accomplish signal multiplexing or demultiplexing, signal conversion or signal transmission to both the external network and to customer equipment along with other necessary ONT functions. Accordingly the optical fiber 766 is an external transport medium as described above. Furthermore, multiple internal transport media extend directly or indirectly from the processor into the customer premises. The internal transport media convey telecommunications information to and from devices within the customer premises 754 as described in detail below. In the particular embodiment of FIG. 7 three internal transport media communicate telecommunications information to and from the processor 758 through appropriate interfaces 765A, 765B and 765C. The embodiments disclosed herein are not limited to any particular number of internal transport media in communication with the ONT processor 758.

Two of the internal transport media illustrated in FIG. 7 are implemented with electrically conductive cables or wiring and are therefore referred to herein as electrically conductive internal transport media. In particular, internal transport medium 767 is a Category 3 twisted-pair telephone cable. Internal transport medium 767 extends to and connects with any number of outlets within the premises suitable for communicating telecommunications information to a device through Category 3 twisted-pair telephone cabling. For example, termination of the internal transport medium 767 may be implemented at selected locations throughout the premises with RJ-11 telephone outlets 768.

An electrically conductive internal transport medium may be implemented with any type of electrically conductive wire or cable suitable for carrying a signal. Representative electrically conductive internal transport media include but are not limited to unshielded twisted pairs of copper wire or Category 3 cabling, one or more of Category 5, 5e, 6, 6e, 7 or another multi-wire cabling, Token Ring™ cable, coaxial cable or any other type of electrically conductive cabling. A second electrically conductive internal transport medium 770 is illustrated in FIG. 7 which communicates with the processor 758 through interface 765B. Internal transport medium 770 is illustrated as a coaxial cable communicating with a television and/or television and set top box combination 772 a computer system 774 and other devices.

As noted above, the network interface device 752 also houses a wireless access point 760. The wireless access point 760 is in communication with the processor 758 through interface 765C. Thus, the wireless access point 760 is configured to wirelessly communicate telecommunications information to or from selected devices within the premises capable of wireless communication under any protocol. Devices could include but are not limited to any or all of smart phone 776, tablet computer 778, laptop computer 780, television and/or television and set top box combination 772, computer 774 or other devices which may be enabled for wireless communication.

In addition, the wireless access point 760 may communicate with a residential gateway 782 which in turn transmits telecommunications information to or from various wired or wireless devices within the premises. Thus, the residential gateway 782 may receive a multiplexed telecommunications signal from the wireless access point 760 or at least multiple types of telecommunications signals. The residential gateway 782 may then demultiplex, at necessary and distribute telecommunications signals to various devices wirelessly or over appropriate wired internal transport media. The inclusion of a residential gateway 782 in communication with the wireless access point 760 is optional, but may provide connectivity flexibility to the operator of the premises 754.

The wireless access point 760, the processor 758 and other elements of the ONT require electrical energy for operation. In certain disclosed embodiments power to at least the wireless access point is provided in a "back-power" configuration over one of the electrically conductive internal transport media. In the particular, but non-limiting embodiment of FIG. 7, power to the wireless access point 760 is provided over the electrically conductive internal transport medium 767 which, as is noted above, is a Category 3 telephone cable network. Selected system embodiments therefore include a power supply 784 which is connected at the input side to the premises AC power and connected at the output side to an electrically conductive internal transport medium such that power may be provided to the network interface device 752 and wireless access point 760 from within the premises. In some embodiments, the processor 758 and associated electronic elements housed within the network interface device 752 may also be powered with current transmitted from within the premises to the network interface device over an electrically conductive internal transport medium.

This specific embodiment of FIG. 7 includes certain optional features which allow a customer to easily install a back-powering system to activate a wireless access point 760 or other ONT elements previously placed within a network interface device by a telecommunications service provider. In particular, the power supply 784 may be implemented as a small self-contained unit suitable to be directly plugged into an AC power outlet 786 at the customer premises 754. A back power cable 788 terminating in a suitable jack, port or plug, for example an RJ-11 telephone jack, may extend from the output of the power supply 784. Alternatively, a jumper cable having suitable jacks or plugs at both ends may be provided to connect the output of the power supply 784 to a suitable socket or receptacle in electrical communication with the conductive internal transport medium.

Thus, when a customer (or a technician) plugs the power supply 784 into a customer's AC wall outlet and plugs connects back power cable 788 or jumper to the conductive internal transport medium 767, power is supplied from the residence to the network interface device 752 over what is typically existing wiring.

Within the network interface device, various components and modules route the power transmitted over the conductive internal transport medium 767 to the wireless access point 760 and potentially to other ONT components including but not limited to processor 758. In certain embodiments, an uninterruptible power supply 790 may be provided in electrical communication with the power supply 784 to assure that the devices within the network interface device 752 which are being powered over the conductive internal transport medium 767 continue to receive power in the event of an AC power interruption.

Although the embodiment illustrated in FIG. 7 illustrates a Category 3 telephone cable as the conductive internal transport medium over which back power is supplied to the network interface device, it is important to note that any type of conductive internal transport media may be used in a similar fashion. The illustrated configuration of power supply 784, back power cable 788 and the simple connection to an outlet such as telephone outlet 768 provides a great deal of customer convenience, but is not limiting. For example, a power supply could be directly connected to any portion of the conductive internal transport medium.

Alternatively, in an embodiment utilizing a residential gateway 782, power may be supplied to the wireless access point 760 or other ONT elements over a Category 5, 5e, 6, 6e, 7, coaxial or other data cable communicating with the residential gateway 782. In selected embodiments, the power supply for the wireless access point 760 may be included within the residential gateway 782 such that back-power is provided when the residential gateway 782 (or a similar device connected to a conductive internal transport medium) is initially plugged in to an AC wall outlet.

Typically, as shown in FIG. 7 one or more telephones 792 will be connected to the telephone outlet 768. In some instances, the conductive internal transport medium 767 will include multiple twisted pairs of wire such that back powering may occur over a twisted-pair which is not used to communicate telecommunications information. Therefore, the power supply 784 or processor 758 may include a module or detection circuit to detect a twisted-pair which is not used to communicate telecommunications information and automatically assign such a twisted-pair to back-powering functionality. In other instances, it may be necessary to provide power to the network interface device 752 over a twisted-pair or other conductive element which is also being used to communicate telecommunications information. Accordingly, the system may include one or more regeneration modules 794 in communication with the conductive internal transport medium 767. The regeneration module 794 will include hardware and/or software configured to provide for the isolation of any device connected to the conductive internal transport medium 767 and further to provide for any required regeneration of a signal, for example a POTS signal, transmitted over the internal transport medium to a device such as the telephone 792. The regeneration module may operate according to any suitable signal regeneration method. For example, the telephony or data signal can be modulated on top of the power. Alternatively, the power can be conveyed via AC at a carrier frequency. The telephony signal can be modulated from baseband to the carrier frequency. A filter can then be used to extract the telephony signal at the other end of the link. In an embodiment where regeneration is required, the AC carrier frequency can be rectified to DC power to power the device. In any embodiment, an isolation device may be implemented to isolate the power from the telephony signal. Then the telephony signal is reformatted, if necessary, to support a POTS telephone set. This apparatus is only required if a wireline phone is going to be used. If not, the RJ-11 port can be eliminated, and the isolation circuitry and modulation circuitry can be eliminated.

As noted above, the optical network termination systems and methods described herein permit a customer to easily power and activate the wireless access point 760 or other ONT system elements from within the customer premises. Therefore, a service provider may choose to install a network interface device 752 on a customer premises which includes a wireless access point 760 and certain other ONT elements described above before a customer has decided to purchase and activate wireless services delivered through the wireless access point. This is beneficial to service providers because no specific installation time must be scheduled to gain entry into the customer's premises to install wireless broadband service.

In particular, a service provider may install an ONT processor 758 and wireless access point 760 at the network interface device at a convenient time, for example when the external transport media extending to the premises at a location or neighborhood is upgraded to optical fiber. At some later point in time a power supply module 784 and associated jumpers or cables can be shipped to the customer. The only step the customer is required to perform to enable wireless broadband is plug the power module into an AC outlet and plug the back power cable 788 or jumper into a suitable port.

However, at certain premises, the wireless access point 760 or processor 758 may remain unpowered indefinitely. In these instances, the processor 758 may include passive pass-through capability, for example a simple relay implemented switch, which provides for the pass-through of POTS, video, data or other signals to the appropriate internal transport media even though the wireless access point 760 and perhaps other portions of the processor remain unpowered.

The wireless access point 760 may serve multiple functions. For example, as noted above, the wireless access point 760 may communicate wirelessly with various devices located throughout the customer premises 754. Therefore, the wireless access point 760 can serve to communicate broadband data, voice or video services to devices within the customer premises. Additionally the wireless access point 760 may be utilized to provide for the wireless offload of mobile telephone signals communicated to the premises over optical fiber from mobile telephone service providers. Thus, the wireless access point 760 implemented with suitable antenna technology as described below may serve to minimize dead spots or problem areas where conventional wireless or cellular telephone signals are attenuated within a premises.

In view of the multiple functions which may be fulfilled by the wireless access point 760, the wireless access point 760 may communicate using any or multiple suitable wireless technologies, including but not limited to WiFi, or another localized broadband wireless technology developed for and/or deployed in unlicensed spectrum or cognitive radio technologies designed to share spectrum, such as "TV White Space" spectrum. Some embodiments may include a wireless access point 760 supporting technologies, such as wireless access technologies (code division multiple access ("CDMA"), Global System for Mobile communications ("GSM"), Long Term Evolution ("LTE"), etc.) and/or different frequency bands (e.g., 700 MHz, 1800 MHz, etc.) employed by different carriers using one or more radios in the access point.

In the FIG. 7 embodiment, the wireless access point communicates using one or multiple wireless technologies through one or more antennae located within or near the network interface device 752. Appropriate or full coverage of all devices within a customer premises may be problematic using an antenna 762 closely associated with the network interface device 752. The scope of coverage in any particular implementation will depend upon the size of the premises 754, the quantity and nature of intervening walls and floors and the selected wireless technology.

Figure 8:
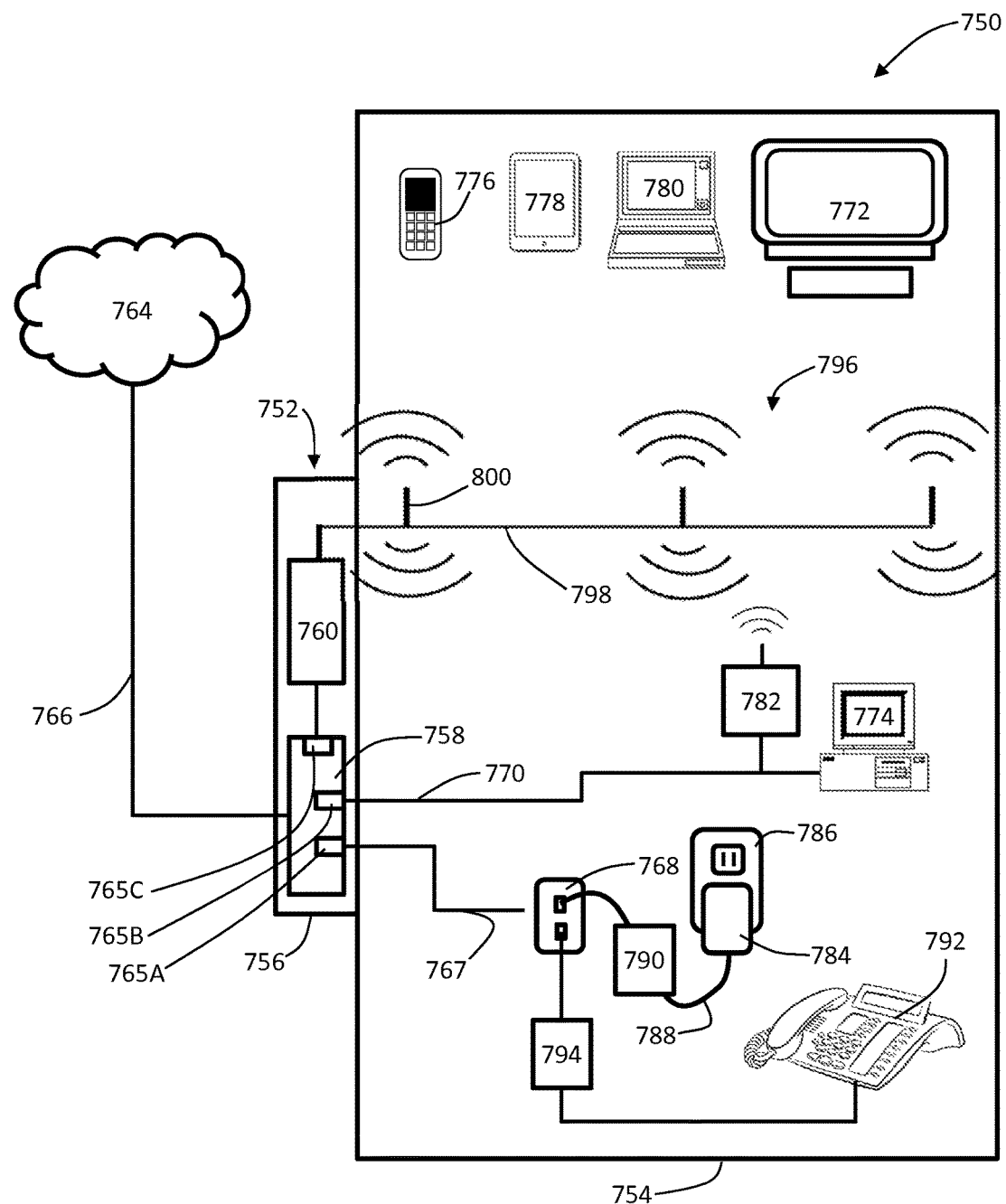
FIG. 8 is a schematic illustration of an optical network termination system featuring a back powered wireless access point and a distributed antenna as disclosed herein.

Accordingly, in certain instances a distributed antenna 796 may be provided, as shown in FIG. 8. In the FIG. 8 embodiment, the antenna 796 includes a feed line 798 extending from the wireless access point 760 to selected locations near or within the premises 754. For example the feed line can be attached to one or more walls and thus be in physical contact with or slightly offset from one or more walls of the customer premises, wrap around selected portions of the interior or exterior of the customer premises or otherwise extend away in any manner from the location of the network interface device 752. A distributed antenna 796 will also include one or more radiating elements 800 extending from the feed line and positioned to broadcast and receive wireless signals. Accordingly, a distributed antenna 796 extending from the network interface device 752 can have multiple radiating elements 800 strategically positioned to provide adequate coverage for some or all devices located within large premises, or premises having multiple intervening walls and floors which would otherwise unduly attenuate the wireless signals communicative from the wireless access point 760.

An enhanced distributed antenna 796 can be provided with the addition of circuitry to sense the strength or quality of received signals. Processing occurring in the processor 758 or another processor will determine whether detected signals are registered to operate on the customer's internal network. If a signal is registered, an appropriate algorithm may be used to determine which radiating element(s) 800 are receiving the strongest signals. Radiating elements 800 that are receiving weaker signals can be disabled and the majority of power used at the radiating element locations where the detected registered signals are strongest. The foregoing "smart antenna" algorithms may be run at appropriate intervals so that changes to device location or device usage within the premises can be tracked with the distributed antenna 796 being appropriately reconfigured as desired.

Alternative embodiments include a network interface device housing the ONT processor 758 and wireless access point 760 elements functioning as described herein.

Figure 9:
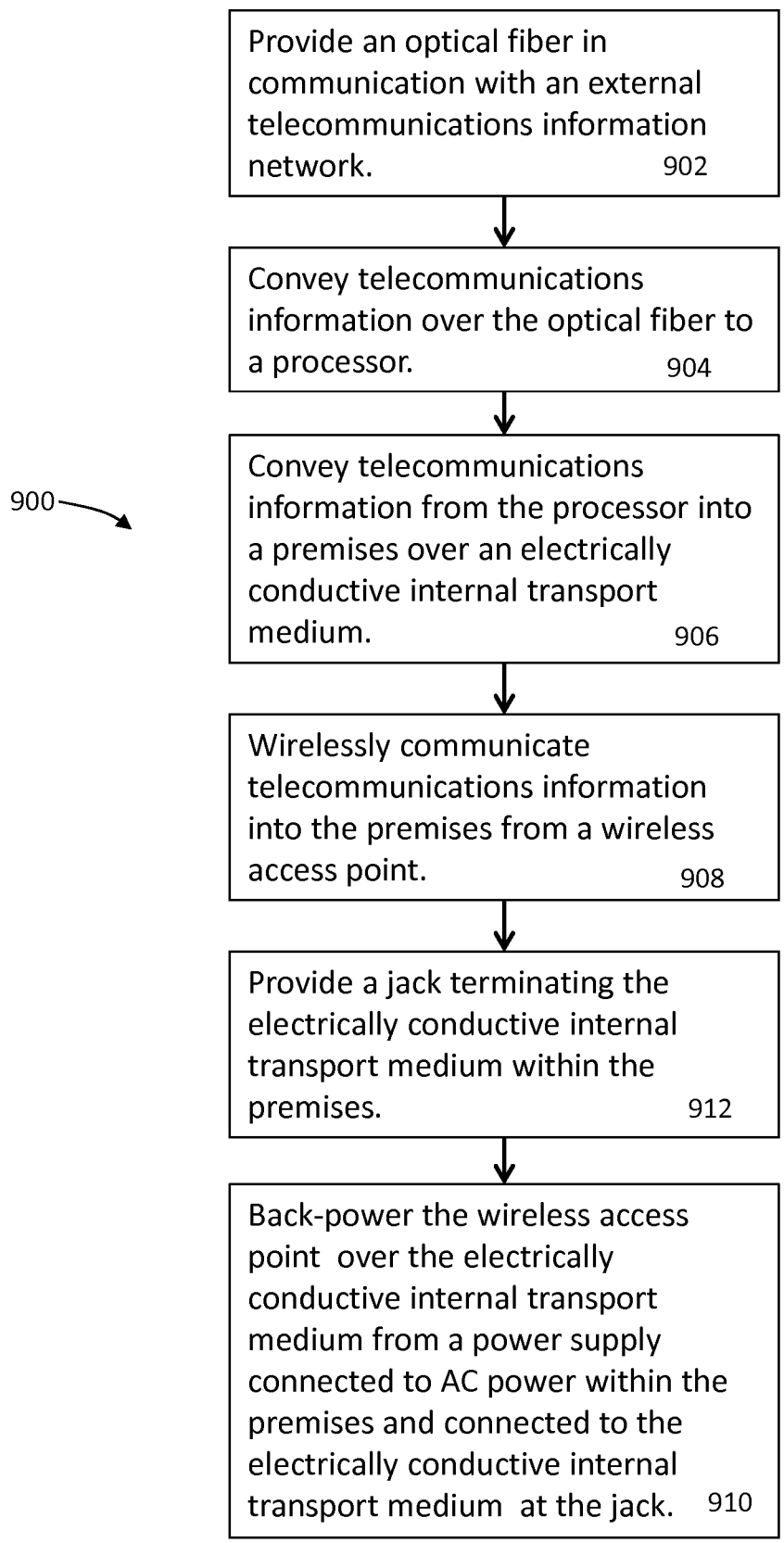
FIG. 9 is a flowchart illustration of a method of terminating optical network as disclosed herein.

Other alternative embodiments include methods of terminating an optical network and providing wireless telecommunications services to a customer. One representative but non-limiting method embodiment is illustrated in flowchart form on FIG. 9. Method 900 includes the steps of providing an optical fiber extending from an external telecommunications information network to or near a customer premises (Step 902). Telecommunications information of any nature may be conveyed to and from an ONT processor at or near the customer premises over the optical fiber (Step 904). The processor serves to terminate the external optical network and therefore multiplexes/demultiplexes the optical signal and otherwise processes the signal as required to convey telecommunications information to and from various non-optical devices located within the customer premises. Accordingly, the method further includes conveying telecommunications information from the processor into the premises over an electrically conductive internal transport medium (Step 906) and wirelessly communicating telecommunications information into the premises from a wireless access point associated with the processor (Step 908). The method 900 further includes back-powering at least the wireless access point over the electrically conductive internal transport medium from a power supply connected to AC power within the premises (Step 910). Accordingly, in certain embodiments an outlet terminating the electrically conductive internal transport medium within the premises is provided and the customer may connect a back power cable or jumper from the power supply to the appropriate outlet to accomplish a connection from the power supply to the electrically conductive internal transport medium (Step 912). Thus, the customer may easily power and activate the wireless access point and perhaps other ONT elements from within the premises.

Certain alternative method embodiments include providing a distributed antenna, for example a distributed antenna having a feed line which wraps one or more exterior walls of the premises or extends to various locations within the premises. The distributive antenna also includes multiple radiating elements distributed around the exterior or interior of the premises. The distributed antenna may have logic associated therewith which selectively powers or disengages certain radiating elements based upon the presence or absence of registered signals from user devices within the premises or other considerations.

Figure 10:
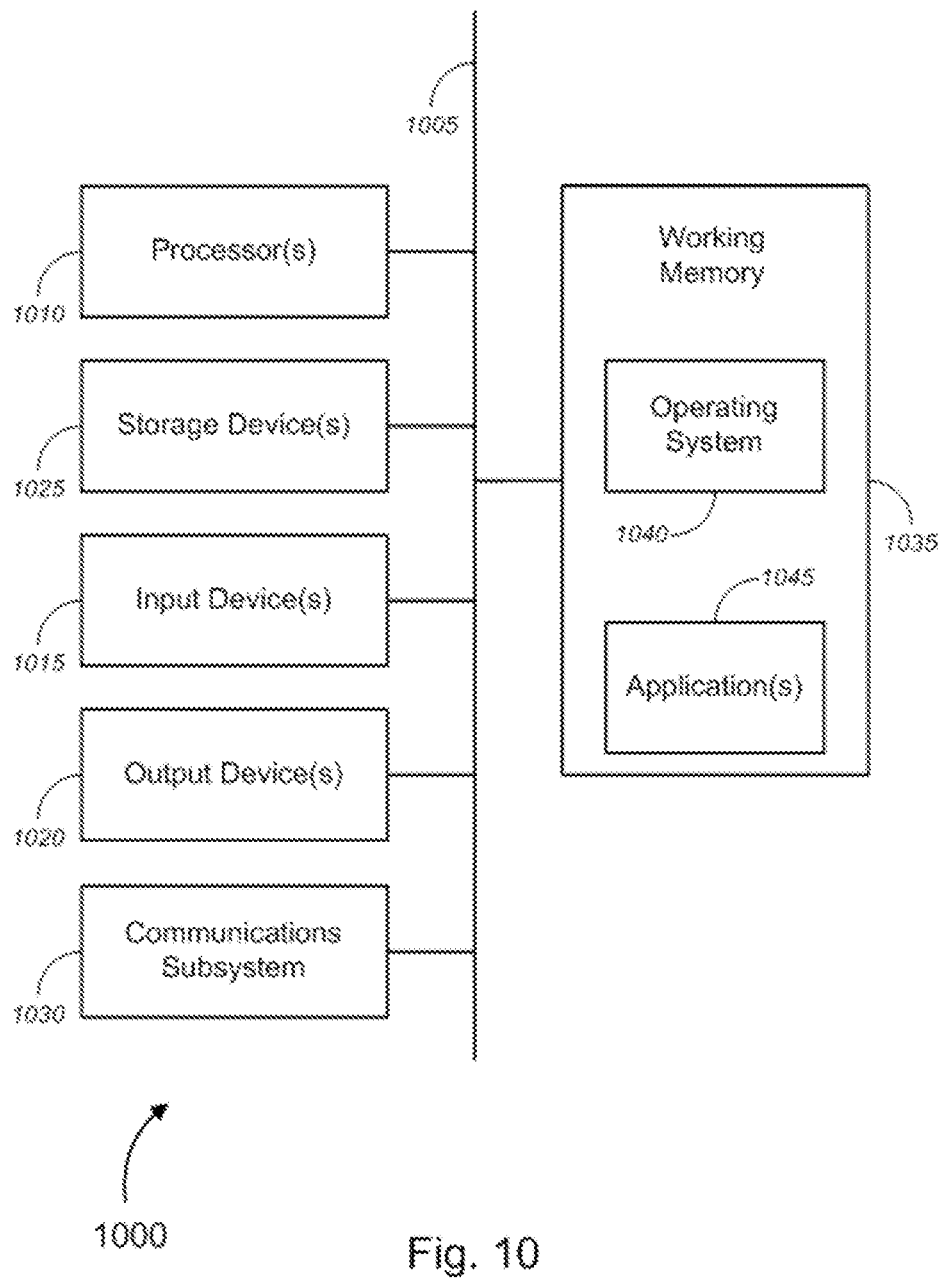
FIG. 10 is a generalized schematic diagram illustrating a computer system, in accordance with various embodiments.

Certain of the foregoing method embodiments may be implemented with logic executed by a computer system. FIG. 10 provides a schematic illustration of one embodiment of a computer system 1000 that can perform the methods provided by various embodiments, as described herein, and/or can function for example, to control a ONT or access point powering method as described above or provide for intelligent antenna management as described above. It should be noted that FIG. 10 is meant only to provide a generalized illustration of various components, of which one or more (or none) of each may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard and/or the like; and one or more output devices 1020, which can include without limitation a display device, a printer and/or the like.

The computer system 1000 may further include (and/or be in communication with) one or more storage devices 1025, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 1030 may permit data to be exchanged with a network (such as the network described below, to name one example), with other computer systems, and/or with any other devices described herein. In many embodiments, the computer system 1000 will further comprise a working memory 1035, which can include a RAM or ROM device, as described above.

The computer system 1000 also may comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 1025 described above. In some cases, the storage medium might be incorporated within a computer system, such as the system 1000. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer readable medium, such as one or more of the storage device(s) 1025. Merely by way of example, execution of the sequences of instructions contained in the working memory 1035 might cause the processor(s) 1010 to perform one or more procedures of the methods described herein.

The terms "machine readable medium" and "computer readable medium," as used herein, refer to any medium that participates in providing data that causes a machine to operation in a specific fashion. In an embodiment implemented using the computer system 1000, various computer readable media might be involved in providing instructions/code to processor(s) 1010 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 1025. Volatile media includes, without limitation, dynamic memory, such as the working memory 1035. Transmission media includes, without limitation, coaxial cables, copper wire and fiber optics, including the wires that comprise the bus 1005, as well as the various components of the communication subsystem 1030 (and/or the media by which the communications subsystem 1030 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments of the invention.

The communications subsystem 1030 (and/or components thereof) generally will receive the signals, and the bus 1005 then might carry the signals (and/or the data, instructions, etc. carried by the signals) to the working memory 1035, from which the processor(s) 1005 retrieves and executes the instructions. The instructions received by the working memory 1035 may optionally be stored on a storage device 1025 either before or after execution by the processor(s) 1010.

While various aspects and features of certain embodiments have been summarized above, the foregoing detailed description illustrates only a few exemplary embodiments in further detail to enable one of skill in the art to practice such embodiments. The described examples are provided for illustrative purposes and are not intended to limit the scope of the invention.

In the foregoing description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

What is claimed is:

1. An optical network termination system comprising:
   an optical fiber in communication with an external telecommunications information network;
   a processor in communication with the optical fiber and providing for the processing of telecommunications information conveyed over the optical fiber to or from the external telecommunications information network said processor being housed outside of a premises;
   an electrically conductive internal transport medium in communication with the processor, wherein the electrically conductive internal transport medium provides for the bidirectional conveyance of a first subset of the telecommunications information from the processor into the premises;
   a wireless internal transport medium comprising a wireless access point in communication with the processor and housed with the processor outside of the premises:
   a distributed antenna in communication with the wireless access point, the distributed antenna comprising a feed line attached to one or more walls of the customer premises and one or more radiating elements extending from the feed line, wherein the wireless internal transport medium provides for the bidirectional wireless conveyance of a second subset of the telecommunication information from the one or more radiating elements into the premises;
   a signal detection circuit in communication with the distributed antenna providing for the detection of a signal received by the one or more radiating elements and further providing for the disabling or enabling of selected radiating elements based upon detected signal strength;
   a port terminating the electrically conductive internal transport medium within the premises;
   a power supply configured to be connected to an AC outlet within the premises; and
   a back-power cable providing for the transmission of power from the power supply to the wireless access point over the electrically conductive internal transport medium upon connection of the back-power cable to the port, wherein the power is provided, over the electrically conductive internal transport medium, to the selected radiating elements.

2. The optical network termination system of claim 1 further comprising a residential gateway within the customer premises in radio communication with the wireless access point.

3. The optical network termination system of claim 1 further comprising an uninterruptable power supply in electrical communication with the power supply, wherein the uninterruptible power supply provides power to the wireless access point over the electrically conductive internal transport medium during the temporary absence of power from the AC outlet.

4. The optical network termination system of claim 1 further comprising a POTS pass-through circuit providing for the pass through of POTS signals received at the processor to the electrically conductive internal transport medium when the wireless access point is not powered.

5. The optical network termination system of claim 1 wherein the electrically conductive internal transport medium comprises at least two twisted pairs of wire connected to a telephone and wherein the power supply comprises a detection circuit providing for the detection of a twisted pair that is not connected to a telephone and wherein the power supply transmits power to the wireless access point over the detected twisted pair of wires that is not connected to a telephone.

6. The optical network termination system of claim 1 wherein the electrically conductive internal transport medium comprises at least one twisted pair of wires connected to a telephone, further comprising a regeneration module providing for the detection of a telephone connected to the twisted pair of wires over which power is transmitted to the wireless access point, wherein the regeneration module provides for the isolation and regeneration of the POTS signals transmitted over the twisted pair of wires.

7. A network interface device comprising:
a housing mounted outside of a premises;
a processor mounted within the housing, the processor providing for the processing of telecommunications information conveyed to or from the processor over an optical fiber in communication with an external telecommunications information network;
an electrically conductive internal transport medium interface mounted within the housing in communication with the processor and further in communication with an electrically conductive internal transport medium, wherein the electrically conductive internal transport medium provides for the bidirectional conveyance of a first subset of the telecommunications information from the processor into the premises; and
a wireless access point mounted within the housing in communication with the processor;
a distributed antenna in communication with the wireless access point, the distributed antenna comprising a feed line attached to one or more walls of the customer premises and one or more radiating elements extending from the feed line, wherein the wireless internal transport medium provides for the bidirectional wireless conveyance of a second subset of the telecommunication information from the one or more radiating elements into the premises;
a signal detection circuit in communication with the distributed antenna providing for the detection of a signal received by the one or more radiating elements and further providing for the disabling or enabling of selected radiating elements based upon detected signal strength;
wherein power is provided to the wireless access point through a power supply configured to be connected to an AC outlet within the premises and a back-power cable providing for the transmission of power from the power supply to the wireless access point through the electrically conductive internal transport medium, wherein the power is provided, over the electrically conductive internal transport medium, to the selected radiating elements.

8. An optical network termination method comprising:
providing an optical fiber in communication with an external telecommunications information network;
conveying telecommunications information over the optical fiber between the external telecommunications information network and a processor in communication with the optical fiber, said processor being mounted in a housing outside of a premises;
conveying a first subset of the telecommunications information from the processor into the premises over an electrically conductive internal transport medium;
wirelessly transmitting a second subset of the telecommunications information into the premises from a wireless access point mounted in the housing, in communication with the processor, wherein the second subset of the telecommunications information is transmitted from a distributed antenna in communication with the wireless access point, the distributed antenna comprising a feed line attached to one or more walls of the customer premises and one or more radiating elements extending from the feed line;
detecting a signal strength at a plurality of the one or more radiating elements with a signal detection circuit in communication with the distributed antenna
disabling or enabling selected radiating elements based upon detected signal strength;
providing a port terminating the electrically conductive internal transport medium within the premises;
connecting a power supply to an AC outlet within the premises;
connecting a back-power cable from the power supply to the port, providing for the transmission of power from the power supply to the wireless access point over the electrically conductive internal transport, wherein the power is provided, over the electrically conductive internal transport medium, to the selected radiating elements.

9. The method of claim 8 further comprising providing a residential gateway within the customer premises in wireless communication with the wireless access point.

10. The method of claim 8 further comprising providing power to the wireless access point over the electrically conductive internal transport medium during the temporary absence of power from the AC outlet from an uninterruptable power supply in electrical communication with the power supply.

11. The method of claim 8 further comprising providing for the pass through of POTS signals received at the processor to the electrically conductive internal transport medium when the wireless access point is not powered.

12. The method of claim 8 further comprising:
providing an electrically conductive internal transport medium comprising at least two twisted pairs of wire connected to a telephone;
detecting a twisted pair that is not connected to a telephone; and
transmitting power to the wireless access point over the detected twisted pair of wires that is not connected to a telephone.

13. The method of claim 8 further comprising:
providing an electrically conductive internal transport medium comprising at least one twisted pair of wires connected to a telephone;
detecting a telephone connected to the twisted pair of wires over which power is transmitted to the wireless access point;
isolating the telephone from the power supply; and
regenerating the POTS signals transmitted over the twisted pair of wires.

* * * * *